US012451112B2

(12) United States Patent
Nakatani et al.

(10) Patent No.: US 12,451,112 B2
(45) Date of Patent: Oct. 21, 2025

(54) ACOUSTIC SIGNAL ENHANCEMENT DEVICE, ACOUSTIC SIGNAL ENHANCEMENT METHOD, AND PROGRAM

(71) Applicant: NTT, Inc., Tokyo (JP)

(72) Inventors: Tomohiro Nakatani, Tokyo (JP); Rintaro Ikeshita, Tokyo (JP); Keisuke Kinoshita, Tokyo (JP); Hiroshi Sawada, Tokyo (JP); Naoyuki Kamo, Tokyo (JP); Shoko Araki, Tokyo (JP)

(73) Assignee: NTT, Inc., Tokyo (JP)

( * ) Notice: Subject to any disclaimer, the term of this patent is extended or adjusted under 35 U.S.C. 154(b) by 97 days.

(21) Appl. No.: 18/571,765

(22) PCT Filed: Sep. 30, 2021

(86) PCT No.: PCT/JP2021/036203
§ 371 (c)(1),
(2) Date: Dec. 19, 2023

(87) PCT Pub. No.: WO2023/276170
PCT Pub. Date: Jan. 5, 2023

(65) Prior Publication Data
US 2024/0312446 A1 Sep. 19, 2024

(51) Int. Cl.
*G10K 11/178* (2006.01)
*H04R 3/00* (2006.01)

(52) U.S. Cl.
CPC .. *G10K 11/17821* (2018.01); *G10K 11/17881* (2018.01); *H04R 3/005* (2013.01)

(58) Field of Classification Search
CPC ........ G10K 11/17823; G10K 11/17857; H04R 3/005; H04R 3/00; H04R 1/406;
(Continued)

(56) References Cited

U.S. PATENT DOCUMENTS

2011/0044462 A1* 2/2011 Yoshioka ............ G10L 21/0208 381/66
2014/0056435 A1* 2/2014 Kjems ..................... G10L 15/20 381/317
(Continued)

FOREIGN PATENT DOCUMENTS

JP 2015135437 A * 7/2015

OTHER PUBLICATIONS

Ikeshita et al. "Independent Vector Extraction for Joint Blind Source Separation and Dereverberation" arXiv <URL: https://arxiv.org/abs/2102.04696v1> Feb. 9, 2021.
(Continued)

*Primary Examiner* — Yogeshkumar Patel

(57) ABSTRACT

There is provided an acoustic signal enhancement device that receives, as an input, a recording sound obtained by frequency division and updates parameters, the device including: assuming that a switch weight is a weight indicating a ratio of a classification to which a recording sound at each timing belongs in classifications of spatial states where a recording sound temporally changes, a beamformer unit that performs beamformer processing based on a weighted spatial covariance matrix which is updated and updates an auxiliary estimation value of a target sound; a switch unit that updates the switch weight and power of a target sound based on the updated auxiliary estimation value and outputs an estimation value of the target sound; and a weighted spatial covariance estimation unit that updates the weighted spatial covariance matrix based on the updated switch weight and the power.

12 Claims, 14 Drawing Sheets

(58) Field of Classification Search
CPC ............. G10L 21/0208; G10L 21/0264; G10L 21/0232; G10L 21/0272
See application file for complete search history.

(56) References Cited

U.S. PATENT DOCUMENTS

| | | | | |
|---|---|---|---|---|
| 2018/0061432 | A1* | 3/2018 | Taniguchi | G10L 21/028 |
| 2022/0068288 | A1* | 3/2022 | Nakatani | H04R 3/00 |

OTHER PUBLICATIONS

Ikeshita et al. "Independent Vector Extraction for Fast Joint Blind Source Separation and Dereverberation" arXiv <URL: https://arxiv.org/abs/2102.04696v2> Apr. 22, 2021.
Nakatani et al."Switching Convolutional Beamformer" Eusipco 2021 <URL: https://eusipco2021-virtual.org> Aug. 16, 2021.
Nakatani et al. "Computationally Efficient and Versatile Framework for Joint Optimization of Blind Speech Separation and Dereverberation" Interspeech 2020 <URL: http://www.interspeech2020.org/uploadfile/pdf/Mon-1-2-9.pdf> Oct. 19, 2020.
Nakatani et al. "Improved Switching Convolutional Beamformer." Acoustical Science and Technology—Journal, Sep. 2021.
Ikeshita et al. "Blind Signal Dereverberation Based on Mixture of Weighted Prediction Error Models" IEEE Signal Processing Letters, vol. 28, Feb. 2, 2021 p. 399-403.
Ikeshita et al. "Independent Vector Extraction for Fast Joint Blind Source Separation and Dereverberation" IEEE Signal Processing Letters, vol. 28, Apr. 20, 2021 p. 972-976.
Yamaoka et al. "Time-Frequency-Bin-Wise Switching of Minimum Variance Distortionless Response Beamformer for Underdetermined Situations," Proc. IEEE ICASSP, pp. 7908-7912, 2019.
Nakatani et al. "Jointly optimal denoising, dereverberation, and source separation," IEEE/ACM Trans. Audio, Speech, and Language Processing, vol. 28, pp. 2267-2282, 2020.

* cited by examiner

ACOUSTIC SIGNAL ENHANCEMENT DEVICE, ACOUSTIC SIGNAL ENHANCEMENT METHOD, AND PROGRAM

CROSS-REFERENCE TO RELATED APPLICATIONS

This application is a U.S. 371 Application of International Patent Application No. PCT/JP2021/036203, filed on 30 Sep. 2021, which application claims priority to and the benefit of International Patent Application No. PCT/JP2021/024833, filed on 30 Jun. 2021, the disclosures of which are hereby incorporated herein by reference in their entireties.

TECHNICAL FIELD

The present invention relates to an acoustic signal enhancement device, an acoustic signal enhancement method, and a program for suppressing noises and reverberations from a recording sound and separating and estimating each target sound from the recording sound.

BACKGROUND ART

Non Patent Literature 1 discloses an acoustic signal enhancement device that performs estimation on a target sound while temporally switching a plurality of outputs obtained by applying the recording sound to a beamformer (refer to FIG. 1). According to the acoustic signal enhancement device 8 described in Non Patent Literature 1, under a condition that an estimation value of an acoustic transmission characteristic related to a direct sound of a target sound and an initial reflected sound (hereinafter, simply referred to as an acoustic transmission characteristic) is given, acoustic signal enhancement is performed by determining which one of a plurality of beamformer outputs is to be used and optimizing a filter coefficient of each beamformer based on a criterion for power minimization of a sound to be processed.

Non Patent Literature 2 discloses an acoustic signal enhancement device that realizes acoustic signal enhancement even in an environment with reverberation by sequentially applying reverberation suppression processing for suppressing reverberations in a recording sound and a beamformer (refer to FIG. 2). According to the acoustic signal enhancement device 9 described in Non Patent Literature 2, under a condition that an estimation value of an acoustic transmission characteristic of a target sound is given, acoustic signal enhancement is performed by simultaneously optimizing reverberation suppression and each filter coefficient of a beamformer based on a criterion that a target sound follows a Gaussian distribution in which power temporally changes.

CITATION LIST

Non Patent Literature

Non Patent Literature 1: Kouei Yamaoka, Nobutaka Ono, Shoji Makino, and Takeshi Yamada, TIME-FREQUENCY-BIN-WISE SWITCHING OF MINIMUM VARIANCE DISTORTIONLESS RESPONSE BEAMFORMER FOR UNDERDETERMINED SITUATIONS, Proc. IEEE ICASSP, pp. 7908-7912, 2019.

Non Patent Literature 2: Tomohiro Nakatani, Christoph Boeddeker, Keisuke Kinoshita, Rintaro Ikeshita, Marc Delcroix, Reinhold Haeb-Umbach, Jointly optimal denoising, dereverberation, and source separation, IEEE/ACM Trans. Audio, Speech, and Language Processing, vol. 28, pp. 2267-2282, 2020.

SUMMARY OF INVENTION

Technical Problem

According to Non Patent Literature 1, a filter coefficient of a beamformer is optimized without considering a statistical property of a target sound. As a result, in a case where an estimation error is included in an estimation value of the acoustic transmission characteristic or in a case where the acoustic transmission characteristic cannot be obtained, the accuracy of acoustic signal enhancement deteriorates.

Therefore, an object of the present invention is to provide an acoustic signal enhancement device capable of accurately suppressing an unnecessary sound that temporally changes even in a case where an estimation error is included in an estimation value of an acoustic transmission characteristic or in a case where an acoustic transmission characteristic cannot be obtained.

Solution to Problem

According to the present invention, there is provided an acoustic signal enhancement device that receives, as an input, a recording sound obtained by frequency division and updates parameters, and the device includes a beamformer unit, a switch unit, and a weighted spatial covariance estimation unit. It is assumed that a switch weight is a weight indicating a ratio of a classification to which a recording sound at each timing belongs in classifications of spatial states where a recording sound temporally changes. The beamformer unit performs beamformer processing based on a weighted spatial covariance matrix which is updated, and updates an auxiliary estimation value of a target sound. The switch unit updates the switch weight and power of a target sound based on the updated auxiliary estimation value, and outputs an estimation value of the target sound. The weighted spatial covariance estimation unit updates the weighted spatial covariance matrix based on the updated switch weight and the power.

Advantageous Effects of Invention

According to the acoustic signal enhancement device of the present invention, even in a case where an estimation error is included in an estimation value of an acoustic transmission characteristic or in a case where an acoustic transmission characteristic cannot be obtained, it is possible to accurately suppress an unnecessary sound that temporally changes.

DESCRIPTION OF EMBODIMENTS

Figure 1:
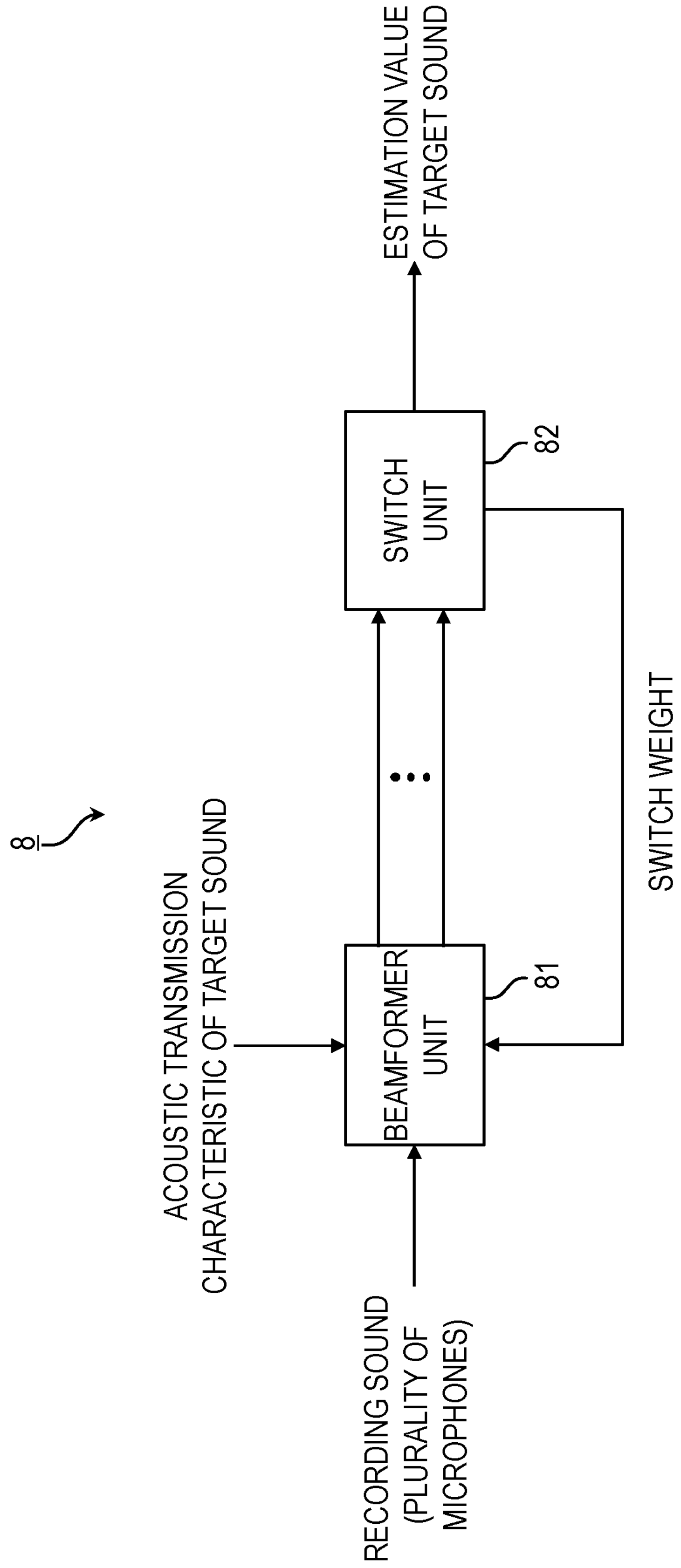
FIG. 1 is a block diagram illustrating a configuration of an acoustic signal enhancement device in Non Patent Literature 1.
Figure 2:
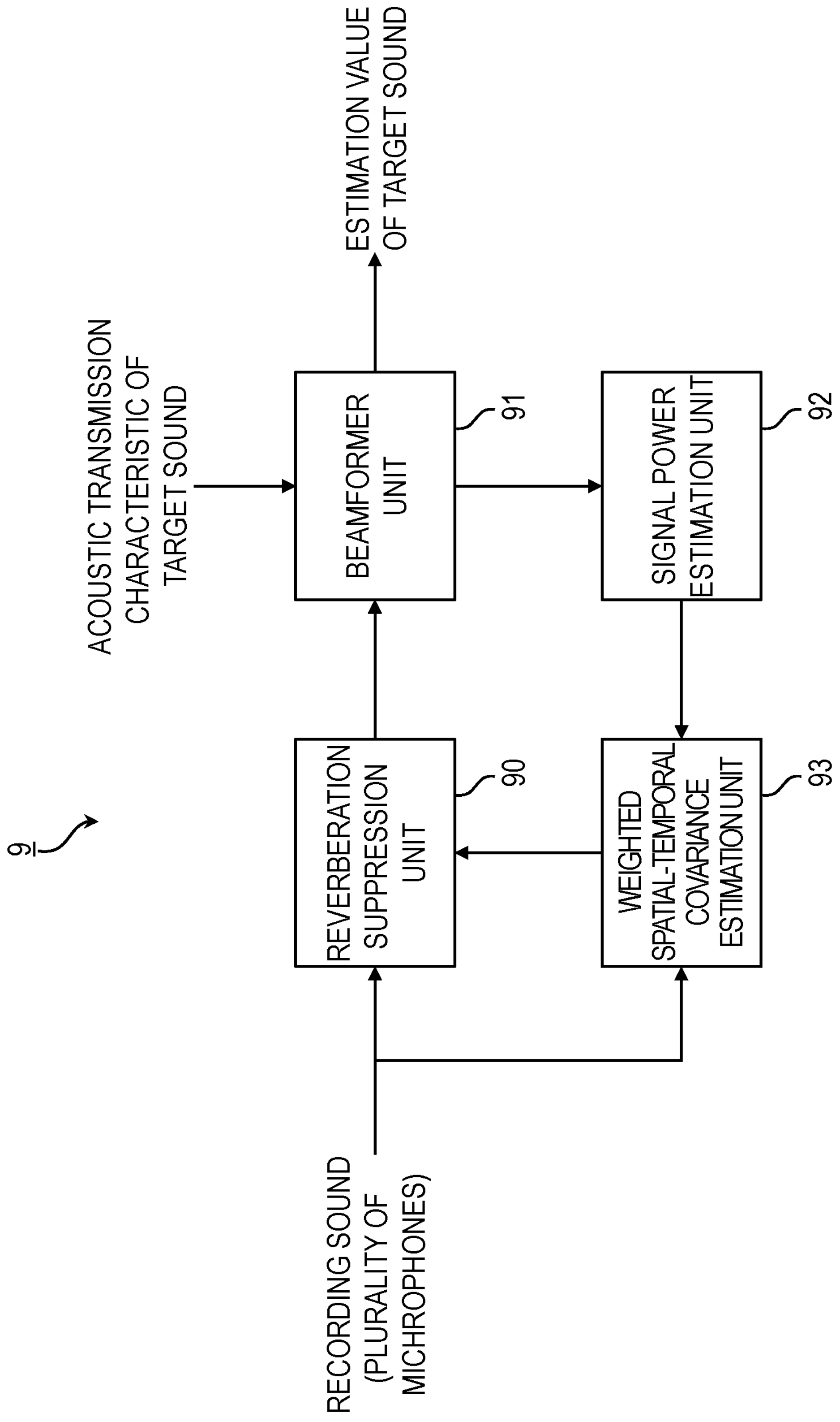
FIG. 2 is a block diagram illustrating a configuration of an acoustic signal enhancement device in Non Patent Literature 2.

Hereinafter, an embodiment of the present invention will be described in detail. Note that components having the same functions will be denoted by the same reference numerals, and redundant description will be omitted.

Example 1

Hereinafter, signals (noises, reverberations, and other target sounds in each target sound estimation) to be suppressed by an acoustic signal enhancement device are collectively referred to as unnecessary sounds.

Figure 3:
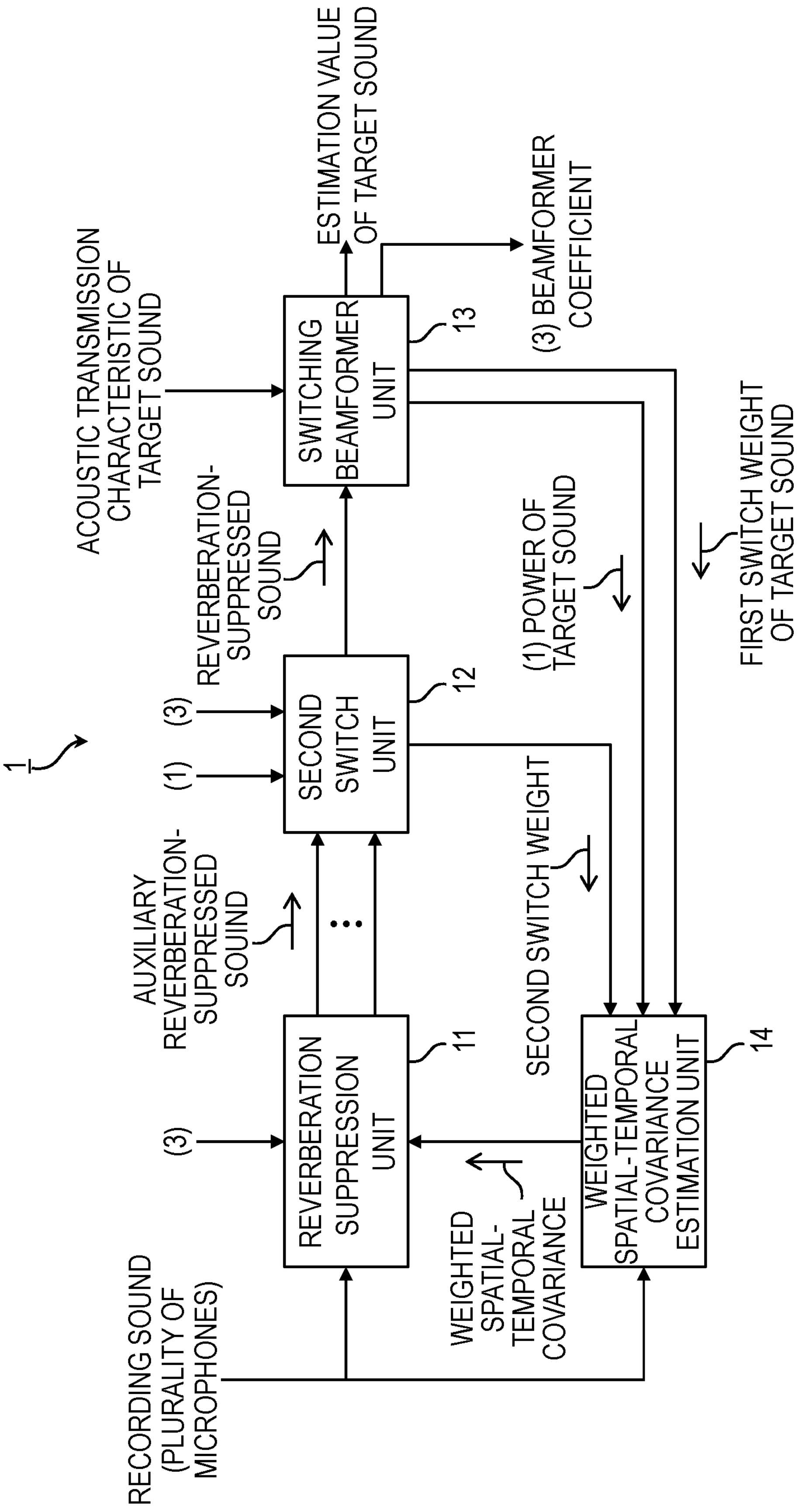
FIG. 3 is a block diagram illustrating a configuration of an acoustic signal enhancement device according to Example 1.
Figure 4:
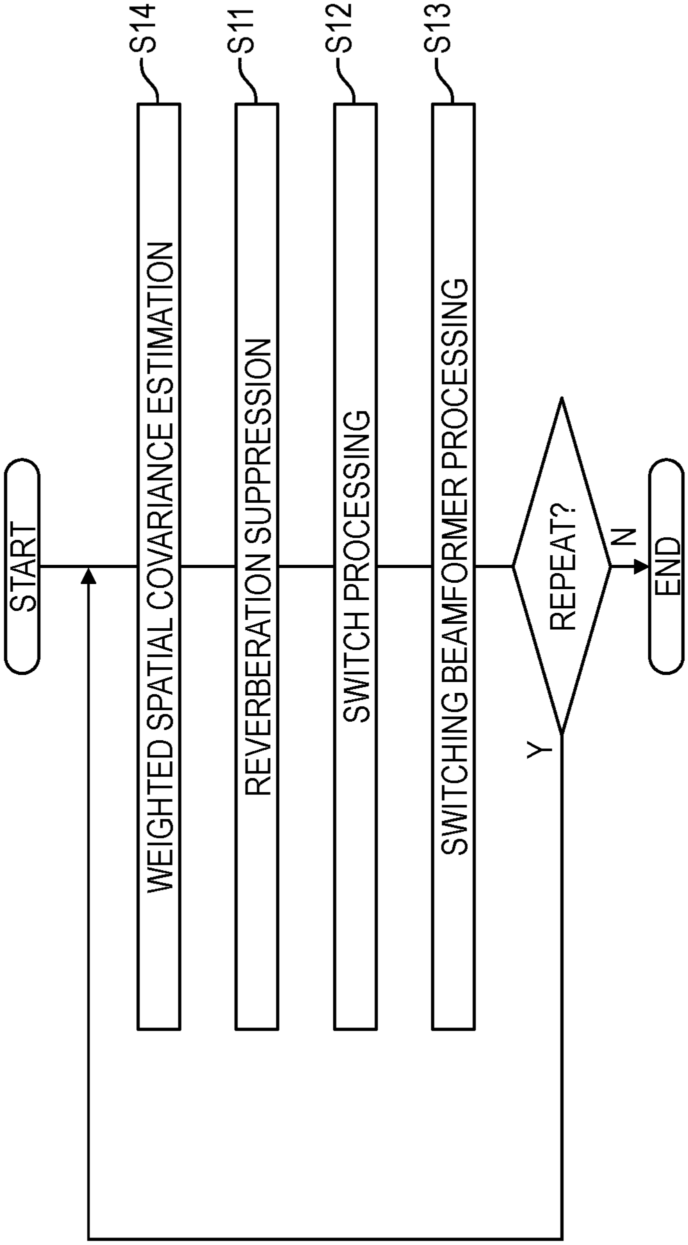
FIG. 4 is a flowchart illustrating an operation of the acoustic signal enhancement device according to Example 1.

Hereinafter, a functional configuration of a target sound enhancement device according to Example 1 will be described with reference to FIG. 3. As illustrated in FIG. 3, the target sound enhancement device 1 according to the present example is a device that includes a reverberation suppression unit 11, a second switch unit 12, a switching beamformer unit 13, and a weighted spatial-temporal covariance estimation unit 14, receives, as inputs, a recording sound obtained by performing frequency division using short-time Fourier transform or the like and an estimation value of an acoustic transmission characteristic of a target sound, and repeats updating of parameters until a predetermined stop condition is satisfied.

In the following description, the same processing is individually executed at each frequency, and thus frequency numbers f of all reference numerals are omitted.

<Configuration of Filter>

The reverberation suppression unit 11 performs reverberation suppression processing according to the following equation.

[Math. 1]

$$z_t = x_t - G_t^H \bar{x}_t \tag{1}$$

The reverberation suppression unit 11 performs beamformer processing according to the following equation.

[Math. 2]

$$y_t = W_t^H z_t \tag{2}$$

Here, $x_t$ (x is in bold and t is in italics) represents a recording sound vector at a timing t (t is in italics), $x^{-}_t$ (x is in bold and t is in italics) represents a time-series vector (L is an order of the filter, and D is a predicted delay of reverberation suppression processing) of a past recording sound from a timing t−L+1 to a timing t-D, $G_t \in C^{M(L-D)\times M}$ represents a filter of reverberation suppression processing (G is in bold, t is in italics, $C^{M(L-D)\times M}$ is a whole set of an M (L−D)×M dimensional complex matrix, and M is the number of microphones), $W_t \in C^{M\times N}$ represents a filter of noise suppression processing (W is in bold, t is in italics, and $C^{M\times N}$ is a whole set of an M×N dimensional complex matrix), $G_t$ and $W_t$ are convolutional beamformers (CBFs) that are to be applied to a time-series of a vector $x_t$ (x is in bold and t is in italics) of a current recording sound and a vector $x_t$ (x is in bold) of a past recording sound, and $(\cdot)^H$ represents conjugate transposition of a matrix.

The filter coefficients in Equation (1) and Equation (2) are further realized by a weighted sum of a plurality of coefficients as in Equation (3).

[Math. 3]

$$G_t = \sum_{i=1}^{I} \gamma_{i,t} G_i \tag{3}$$

and $$w_{n,t} = \sum_{j=1}^{J} \delta_{n,j,t} W_{n,j}$$

In Equation (3), $w_{n,j}$ (w is in bold) and $\delta_{n,j,t}$ represent a filter coefficient (also referred to as a beamformer coefficient) of a j-th beamformer related to an n-th target sound and a first switch weight at a timing t. In addition, in Equation (3), $G_i$ (G is in bold) and $\gamma_i$, t are a filter coefficient of i-th reverberation suppression processing and a second switch weight at a timing t. The first switch weight is a weight indicating a ratio of a classification to which a recording sound at each timing belongs in classifications of spatial states where a recording sound temporally changes, and the second switch weight is a weight indicating a ratio of a classification to which a recording sound at each timing belongs in classifications of spatial-temporal states where a recording sound temporally changes. The classification of the spatial-temporal state is a combination of a target sound and a spatial-temporal covariance of a time frame that is to be assigned to the target sound.

<Criterion of Optimization>

It is assumed that an estimated target sound $y_{n,t}$ follows a complex Gaussian distribution with an average of 0 and a variance $\lambda_{n,t}$ as in Equation (4).

[Math. 4]

$$p(y_{n,t}; \lambda_{n,t}) = \frac{1}{\pi\lambda_{n,t}} \exp\left(-\frac{|y_{n,t}|^2}{\lambda_{n,t}}\right) \tag{4}$$

In order to estimate the filter, the following likelihood function is obtained under assumptions by Equation (4), Equation (5), and Equation (6).

[Math. 5]

$$\boldsymbol{w}_{n,t}^{H}\boldsymbol{h}_n = h_{n,r} \text{ and } \boldsymbol{B}_t^{H}\boldsymbol{h}_n = 0 \tag{5}$$

$$p\left(\{y_{n,t}\}_{n,t'}\{\tilde{\boldsymbol{v}}_{t'}\}_{t'}\right) = \prod_{n,t} p(y_{n,t}) \prod_{t'} p(\tilde{\boldsymbol{v}}_{t'}) \tag{6}$$

[Math. 6]

$$L(\theta) = -\sum_{n=1}^{N}\left(\frac{|y_{n,t}|^2}{\lambda_{n,t}} + \log\lambda_{n,t}\right) \tag{7}$$

$$\text{s.t. } \boldsymbol{w}_{n,t}^{H}\boldsymbol{h}_n = h_{n,r} \text{ for all } n \text{ and } t$$

The likelihood function of Equation (7) serves as a criterion for optimization of acoustic signal enhancement processing. In Equation (7), $h_n$ is an estimation value of an acoustic transmission characteristic of the n-th target sound, $B_t$ ($\in C^{M\times(M-N)}$, B is in bold, and t is in italics) is an auxiliary coefficient matrix for generating $v_{\sim t}$ (v is in bold and t is in italics), and $v_{\sim t}$ ($\in C^{M-N}$) is an auxiliary output corresponding to noise estimation.

That is, parameters (all filter coefficients, switch weights, power of each target sound (=variance of the complex Gaussian distribution)) that maximize the likelihood function are obtained.

<Optimization Method>

A method of obtaining parameters that maximize Equation (7) in a closed form is not known. Thus, optimization is performed by repeating processing of alternately updating (at that time, other parameters are fixed) individual parameters.

<Processing Flow: Initialization>

Power $\lambda_{n,t}$ of each target sound: reverberation suppression is performed on the recording sound by a weighted prediction error minimized reverberation suppression (WPE) method (referenced Non Patent Literature 1) in the related art, and initialization is performed on the recording sound by using the power of each target sound obtained by a minimum power distortionless response beamformer (referenced Non Patent Literature 2). A method of initialization by using power of each target sound is not limited to the above-described method, and any method can be used.

(Referenced Non Patent Literature 1: Tomohiro Nakatani, Takuya Yoshioka, Keisuke Kinoshita, Masato Miyoshi, Biing-Hwang, Speech dereverberation based on variance-normalized delayed linear prediction, IEEE Trans. Audio, Speech, and Language Processing, vol. 18, no. 7, pp. 1717-1731, 2010.)

(Referenced Non Patent Literature 2: Livnat Ehrenberg, Sharon Gannot, Amir Leshem, Ephraim Zehavi, Sensitivity analysis of MVDR and MPDR beamformers, Proc. IEEE Convention of Electrical and Electronics Engineers in Israel, 2010)

Further, all switch weights are initialized by using a random number.

<Processing Flow: Repetition of Processing>

The following processing is repeated until a convergence condition is satisfied (or a certain number of times).

[Weighted Spatial-Temporal Covariance Estimation Unit 14]

The weighted spatial-temporal covariance estimation unit 14 updates the weighted spatial-temporal covariance matrix based on the first switch weight, the second switch weight, and the power (S14). More specifically, the weighted spatial-temporal covariance estimation unit 14 updates weighted spatial-temporal covariance matrixes $R_{n,i,j}$ and $P_{n,i,j}$ (R and P are in bold, and n, i, j is in italics), which are related each target sound (1≤n≤N), each output of the reverberation suppression processing (1≤i≤I), and each output of the beamformer (1≤j≤J), by Equation (8) and Equation (9).

[Math. 7]

$$\boldsymbol{R}_{n,i,j} = \sum_t \frac{\delta_{n,j,t}\gamma_{t,i}}{\lambda_{n,t}}\overline{\boldsymbol{x}}_t\overline{\boldsymbol{x}}_t^{H} \in C^{M(L-D)\times M(L-D)} \tag{8}$$

$$\boldsymbol{P}_{n,i,j} = \sum_t \frac{\delta_{n,j,t}\gamma_{t,i}}{\lambda_{n,t}}\overline{\boldsymbol{x}}_t\boldsymbol{x}_t^{H} \in C^{M(L-D)\times M} \tag{9}$$

In Equation (8) and Equation (9), $x^{-}_t$ (x is in bold and t is in italics) is a vector including signals of past several samples from a timing t for each channel, and thus R and P (both R and P are in bold) are defined as "weighted spatial-temporal covariance". Weighting the covariance according to a ratio between the switch weight and the power as described above can also be expressed as "simultaneously feeding back of the power of the target sound and the switch weight to the covariance".

[Reverberation Suppression Unit 11]

The reverberation suppression unit 11 performs reverberation suppression processing on the recording sound, performs beamformer processing based on the weighted spatial-temporal covariance matrix which is updated, and updates an auxiliary reverberation-suppressed sound of the target sound (S11). More specifically, the reverberation suppression unit 11 updates each filter coefficient $G_i$ (1≤i≤I) by Equation (10), Equation (11), and Equation (12).

[Math. 8]

$$\boldsymbol{g}_i \leftarrow \Psi_i^{+}\, vec(\boldsymbol{\Phi}_i) \in C^{M^2(L-D)} \tag{10}$$

$$\boldsymbol{\Psi}_i = \sum_{j,n}\left(\boldsymbol{w}_{n,j}\boldsymbol{w}_{n,j}^{H}\right)^{*} \otimes \boldsymbol{R}_{n,i,j} \in C^{M^2(L-D)\times M^2(L-D)} \tag{11}$$

$$\boldsymbol{\Phi}_i = \sum_{j,n}\boldsymbol{P}_{n,i,j}\left(\boldsymbol{w}_{n,j}\boldsymbol{w}_{n,j}^{H}\right) \in C^{M(L-D)\times M} \tag{12}$$

Here, vec (·) represents a function that receives one matrix as an input and outputs a column vector formed by vertically connecting each column of the matrix. $g_i$ is a vector obtained by $g_i$=vec ($G_i$), and updating $g_i$ corresponds to updating $G_i$. ( )* indicates a pseudo inverse matrix. The reverberation suppression unit 11 updates each auxiliary reverberation-suppressed sound $z_{i,t}$ (z is in bold, and i and t are in italics) by Equation (13).

[Math. 9]

$$z_{i,t} = \boldsymbol{x}_t - \boldsymbol{G}_i^{H}\overline{\boldsymbol{x}}_t \tag{13}$$

[Second Switch Unit 12]

The second switch unit 12 updates the switch weight (second switch weight) and the reverberation-suppressed sound based on the auxiliary reverberation-suppressed sound, the updated power of the target sound, and the updated beamformer coefficient (S12). More specifically, the second switch unit 12 updates the second switch weight $\gamma_{i,t}$ by Equation (14).

[Math. 10]

$$\gamma_{i,t} \leftarrow \begin{cases} 1 & \text{for } i = \operatorname{argmin}_{i'} \sum_n \frac{\left|\sum_j \delta_{n,j,t} w_{n,j}^H z_{i',t}\right|^2}{\lambda_{n,t}} \\ 0 & \text{otherwise} \end{cases} \quad (14)$$

The second switch unit 12 updates the reverberation-suppressed sound $z_t$ (z is in bold and t is in italics) by Equation (15).

[Math. 11]

$$z_t = \sum_i \gamma_{i,t} z_{i,t} \quad (15)$$

[Switching Beamformer Unit 13]

Figure 5:
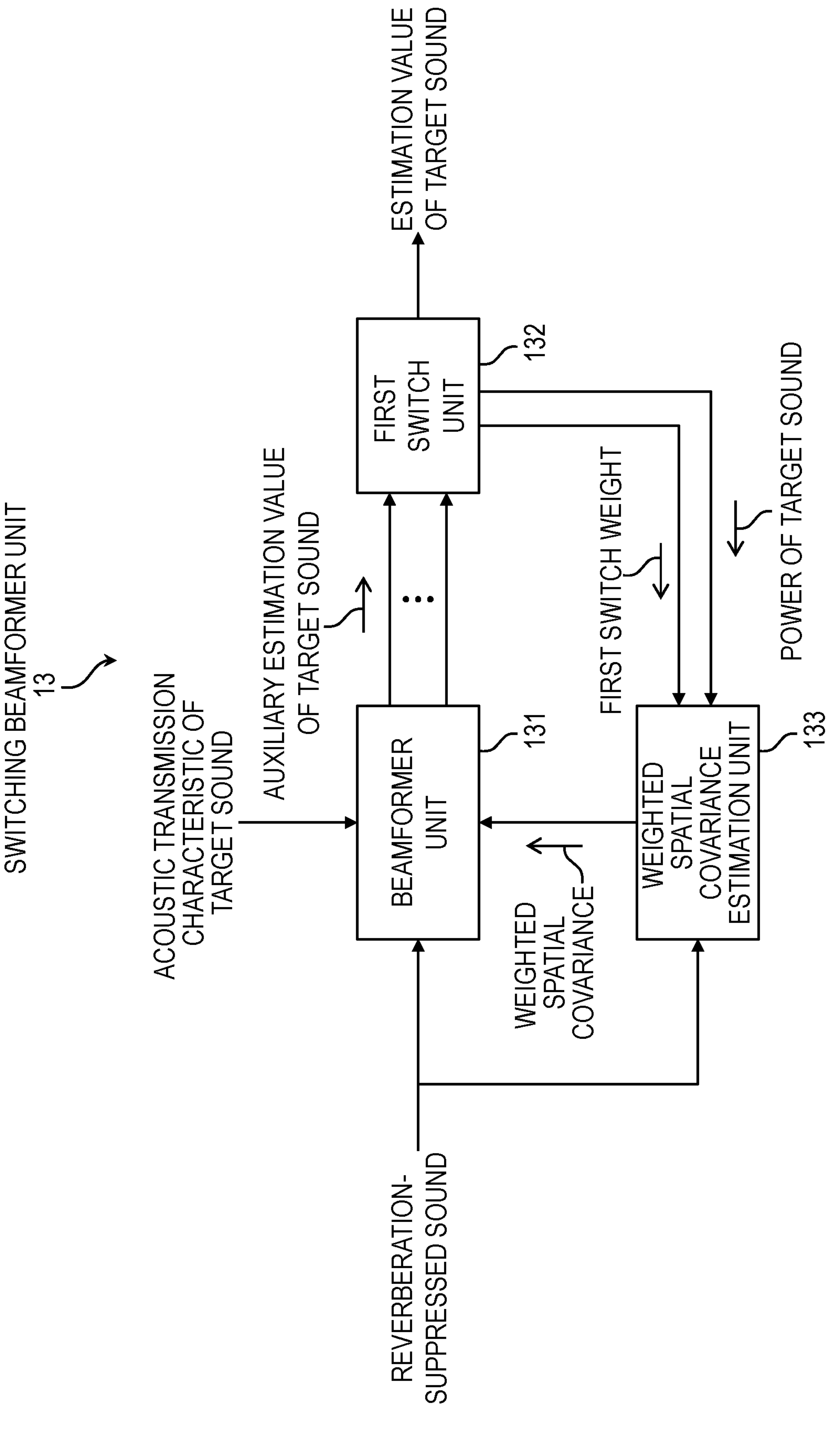
FIG. 5 is a block diagram illustrating a configuration of a switching beamformer unit according to Example 1.
Figure 6:
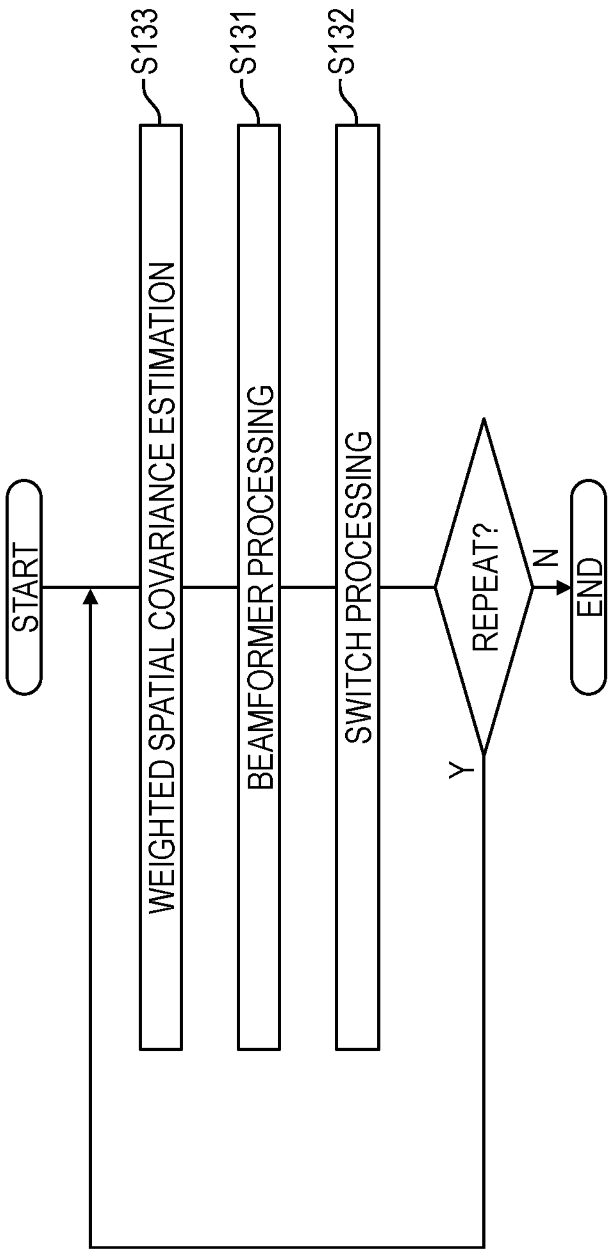
FIG. 6 is a flowchart illustrating an operation of the switching beamformer unit according to Example 1.

The switching beamformer unit 13 updates the estimation value of the target sound, the beamformer coefficient, the power of the target sound, and the switch weight (first switch weight) of the target sound based on the estimation value of the acoustic transmission characteristic and the updated reverberation-suppressed sound (S13). More specifically, as illustrated in FIG. 5, the switching beamformer unit 13 includes a beamformer unit 131, a first switch unit 132, and a weighted spatial covariance estimation unit 133.

The switching beamformer unit 13 acquires the updated reverberation-suppressed sound $z_t$ (z is in bold and t is in italics) and repeats the following processing, for each target sound n, a certain number of times.

[Weighted Spatial Covariance Estimation Unit 133]

The weighted spatial covariance estimation unit 133 updates the spatial covariance matrix $\Sigma_{n,j}$ (n, j is in italics), which is related to each output (1≤j≤J) of the beamformer, by Equation (16) (S133).

[Math. 12]

$$\sum\nolimits_{n,j} = \sum_t \frac{\delta_{n,j,t}}{\lambda_{n,t}} z_t z_t^H \quad (16)$$

In Equation (16), $z_t$ (z is in bold and t is in italics) is a vector including values of signals for each channel at a timing t, and thus ¿ is defined as "weighted spatial covariance". Weighting the covariance according to a ratio between the switch weight and the power as described above can also be expressed as "simultaneously feeding back of the power of the target sound and the switch weight to the covariance".

By feeding back of the switch weight and the power of the target sound to the weighted spatial covariance estimation unit 133, it is possible to perform optimization by simultaneously considering a viewpoint of whether the recording sound is the background sound or the target sound (efficiency of an audio model) and a viewpoint of how the background sound is spatially distributed (efficiency of the first switch). Thus, it is possible to classify the spatial distribution of the background sound around a background sound section. Thereby, even in a case where an error is included in the estimation value of the acoustic transmission characteristic of the target sound, it is possible to accurately suppress the unnecessary sound that temporally changes without being affected by the error.

A model of an audio having power which temporally changes is used to distinguish whether or not a target sound is included in each time frame. Specifically, a spatial covariance matrix mainly focusing on a noise section is obtained by calculating, based on a maximum likelihood method, a spatial covariance matrix with a weight of a reciprocal of the audio power. By estimating the beamformer using the spatial covariance matrix (accurately even in a case where an error is included in the estimation value of the acoustic transmission characteristic of the target sound), the power of the noise can be minimized.

In addition, in Equation (16), as the eigen value of Σ is larger, the beamformer is optimized such that a signal in a direction corresponding to the eigen value is weakened. Thus, in a case where the spatial covariance has a large value with respect to the estimation value of the power of the target sound, the beamformer is updated such that a noise is weakened.

[Beamformer Unit 131]

The beamformer unit 131 updates each filter coefficient $w_{n,j}$ (1≤j≤J) by Equation (17) (S131).

[Math. 13]

$$w_{n,j} \leftarrow \frac{h_{n,r}^* \sum_{n,j}^{-1} h_n}{h_n^H \sum_{n,j}^{-1} h_n} \quad (17)$$

The beamformer unit 131 updates each auxiliary estimation value $y_{j,t}$ (italic) of the target sound as follows (S131).

[Math. 14]

$$y_{j,t} = w_{n,j}^H z_t \quad (18)$$

[Modification Example of Beamformer Unit 131]

The referenced Non Patent Literature 3 discloses that beamformer estimation in a form of Equation (17) can be transformed into the following form, which does not require an acoustic transmission characteristic $h_n$.

[Math. 15]

$$w_{n,j} \leftarrow \frac{\sum_{n,j}^{-1} \Phi_n}{\operatorname{Trace}\left(\sum_{n,j}^{-1} \Phi_n\right)} e_r \quad (17')$$

Here, $\phi n \in C^{M \times M}$ represents a spatial covariance matrix of the target audio, $e_r$ represents an M-dimensional real number vector in which a r-th element is 1 and the other elements are 0, and Trace (·) represents a function for obtaining a trace of the matrix. By using the update Equation, the beamformer can be estimated even in a case where the estimation value of the acoustic transmission characteristic is not given. In the referenced Non Patent Literature 3, a noise space covariance matrix is used instead of $\Sigma_{n,j}$. As a result, there is a problem that a beamformer with high accuracy cannot be estimated in a case where an estimation error is included in the noise space covariance matrix or ϕn. On the other hand, in the present invention, $\Sigma_{n,j}$ is used instead of a noise space covariance matrix. Therefore, it is possible to accurately estimate the beamformer even in a case where an estimation error is included in ϕn.

A method of obtaining the spatial covariance matrix ϕn of the target sound from the recording sound is disclosed in, for example, the referenced Non Patent Literatures 3, 4, and 5.

(Referenced Non Patent Literature 3: M. Souden, J. Benesty, S. Affes, "On optimal frequency-domain multi-channel linear filtering for noise reduction, IEEE Transactions on Audio, Speech, and Language Processing", 18 (2), pp. 260-276, 2010.)

(Referenced Non Patent Literature 4: J. Heymann, L. Drude, C. Boeddeker, P. Hanebrink, R. Haeb-Umbach, "BEAMNET: END-TO-END TRAINING OF A BEAMFORMER-SUPPORTED MULTI-CHANNEL ASR SYSTEM", Proc. ICASSP, pp. 5325-5329, 2017.)

(Referenced Non Patent Literature 5: Takuya Yoshioka, Nobutaka Ito, Marc Delcroix, Atsunori Ogawa, Keisuke Kinoshita, Masakiyo Fujimoto, Chengzhu Yu, Wojciech J Fabian, Miquel Espi, Takuya Higuchi, Shoko Araki, Tomohiro Nakatani, "The NTT CHiME-3 system: Advances in speech enhancement and recognition for mobile multi-microphone devices", Proc. 2015 IEEE Workshop on Automatic Speech Recognition and Understanding (ASRU), pp. 436-443, 2015.)

In a case where the modification example of the beamformer unit 131 is used, the target sound enhancement device may not receive the estimation value of the acoustic transmission characteristic as an input.

[First Switch Unit 132]

The first switch unit 132 updates the first switch weight $\delta_{n,j,t}$ (italic) of each output (1≤j≤J) of the beamformer by Equation (19) (S132). The first switch unit 132 is used to classify the background sound in each time frame into several spatial states (directions from which larger noises are heard), and estimate different beamformers for each state.

[Math. 16]

$$\delta_{n,j,t} \leftarrow \begin{cases} 1 & \text{if } j = \text{argmin}_{j'} |y_{j',t}|^2 \\ 0 & \text{otherwise} \end{cases} \tag{19}$$

The first switch unit 132 updates the estimation value $y_{n,t}$ of the target sound by Equation (20).

[Math. 17]

$$y_{n,t} = \sum_j \delta_{n,j,t} y_{j,t} \tag{20}$$

The first switch unit 132 updates the power $\lambda_{n,t}$ of the target sound by Equation (21) (S132). The first switch unit 132 outputs the estimation value $y_{n,t}$ of each target sound (S132).

[Math. 18]

$$\lambda_{n,t} \leftarrow |y_{n,t}|^2 \tag{21}$$

The first switch unit 132 determines whether or not to use a spatial covariance corresponding to a frame t, for an n-th target sound and a t-th time frame in a classification j of the spatial state. Here, the "classification of the spatial state" is defined by "a combination of a target sound and a spatial covariance of a time frame that is to be assigned to the target sound".

Example 2

Figure 7:
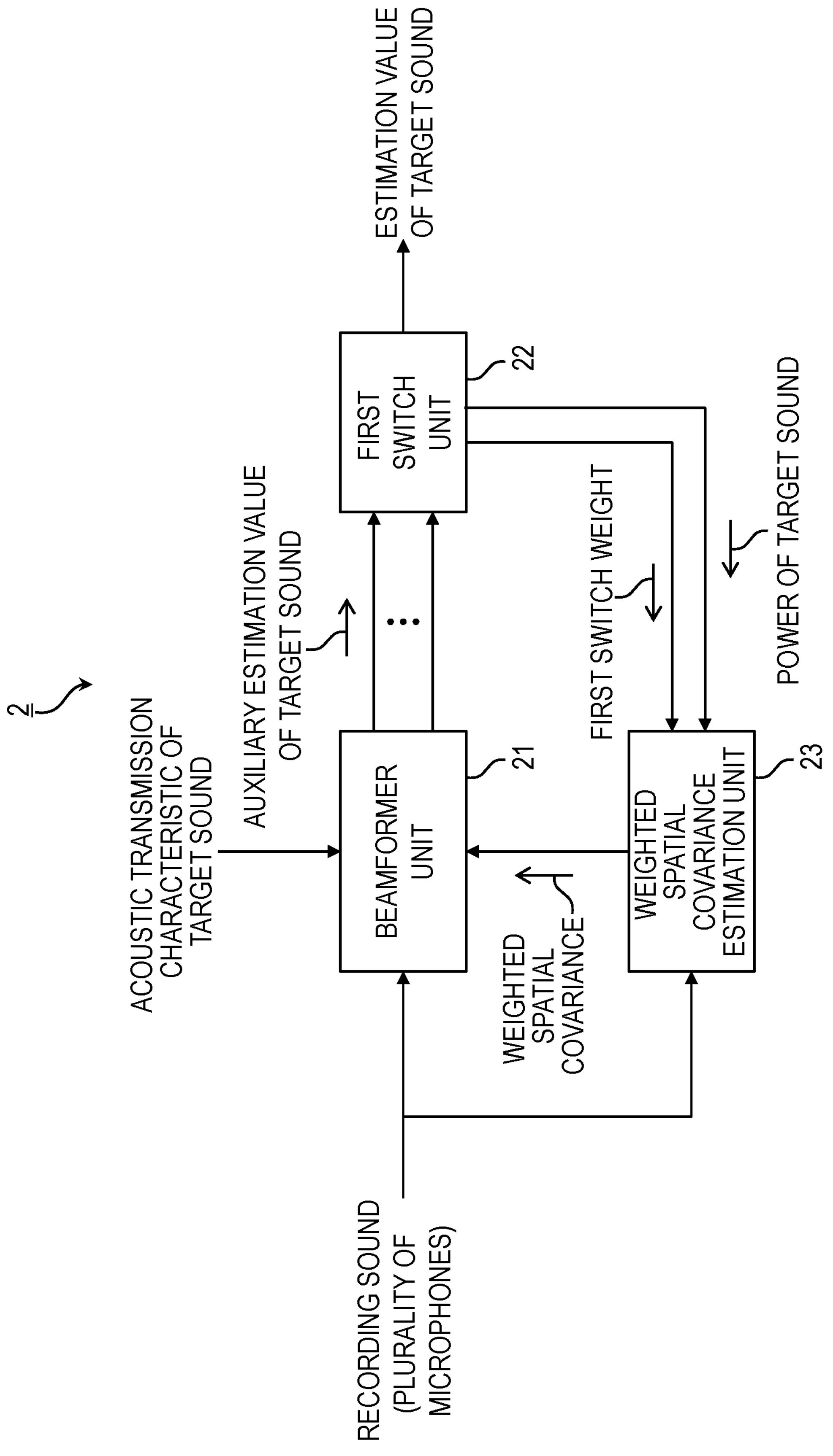
FIG. 7 is a block diagram illustrating a configuration of an acoustic signal enhancement device according to Example 2.
Figure 8:
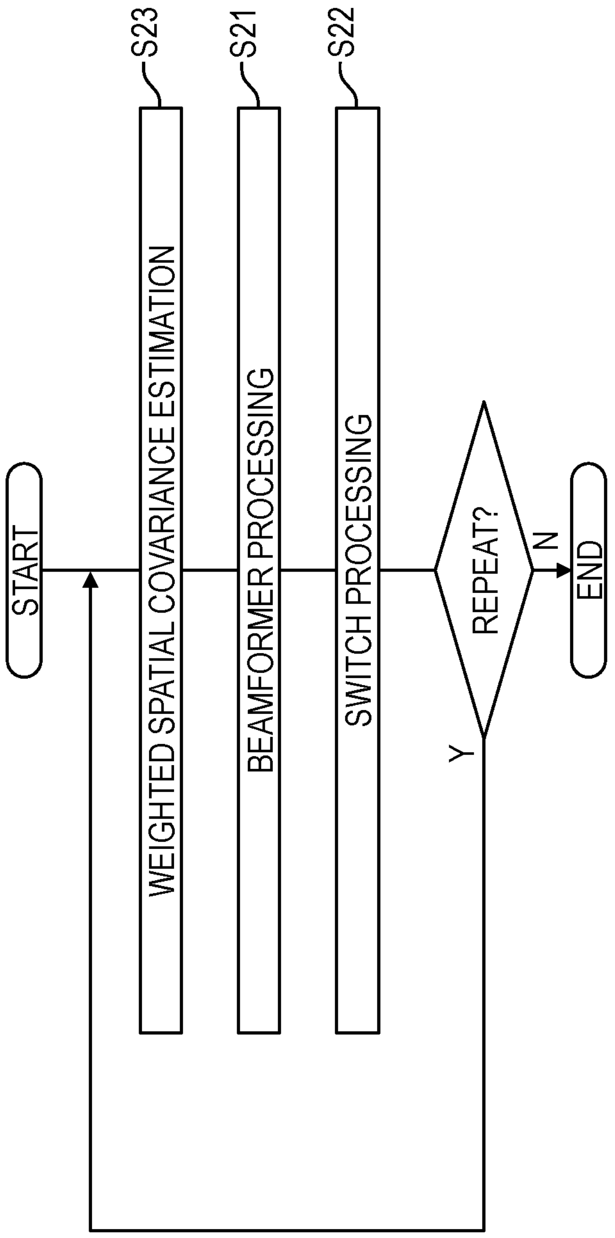
FIG. 8 is a flowchart illustrating an operation of the acoustic signal enhancement device according to Example 2.

Hereinafter, a functional configuration of a target sound enhancement device according to Example 2 will be described with reference to FIG. 7. As illustrated in FIG. 7, a target sound enhancement device 2 according to the present example includes a beamformer unit 21, a first switch unit 22, and a weighted spatial covariance estimation unit 23, and has the same configuration as the switching beamformer unit 13 according to Example 1. The target sound enhancement device 2 receives, as inputs, a recording sound obtained by performing frequency division using short-time Fourier transform or the like and an estimation value of an acoustic transmission characteristic of a target sound, and repeats updating of parameters until a predetermined stop condition is satisfied.

<Configuration of Filter>

The beamformer unit 21 performs beamformer processing according to Equation (2) (Here, the reverberation-suppressed sound $z_t$ of Equation (2) is replaced with the recording sound $x_t$). The filter coefficients in Equation (2) are further realized by a weighted sum of a plurality of coefficients as in Equation (3).

In Equation (3), $w_{n,j}$ (w is in bold and n and j are in italics) and $\delta_{n,j,t}$ (italic) represent a filter coefficient of a j-th beamformer related to an n-th target sound and a first switch weight at a timing t.

<Criterion of Optimization>

It is assumed that an estimated target sound follows a complex Gaussian distribution with an average of 0 and a variance $\lambda_{n,t}$ as in Equation (4). In the estimation of the filter, the likelihood function of Equation (7) serves as a criterion for optimization of the acoustic signal enhancement processing under the assumption of Equation (4), Equation (5), and Equation (6). In Equation (7), $h_n$ is an estimation value of the acoustic transmission characteristic of the n-th target sound. That is, parameters (all filter coefficients, switch weights, power of each target sound (=variance of the complex Gaussian distribution)) that maximize the likelihood function are obtained.

<Optimization Method>

A method of obtaining parameters that maximize Equation (7) in a closed form is not known. Thus, optimization is performed by repeating processing of alternately updating (at that time, other parameters are fixed) individual parameters.

<Processing Flow: Initialization>

Power $\lambda_{n,t}$ of each target sound: initialization is performed on the recording sound by using power of each target sound obtained by a minimum power distortionless response beamformer (referenced Non Patent Literature 2) in the related art. Further, all switch weights are initialized by using a random number.

<Processing Flow: Repetition of Processing>

The following processing is repeated until a convergence condition is satisfied (or a certain number of times).

[Weighted Spatial Covariance Estimation Unit 23]

The weighted spatial covariance estimation unit 23 updates the weighted spatial covariance matrix based on the updated switch weight and the updated power (S23). More specifically, the weighted spatial covariance estimation unit 23 updates the spatial covariance matrix $\Sigma_{n,j}$, which is related to each output (1≤j≤J) of the beamformer, by Equation (16).

[Beamformer Unit 21]

The beamformer unit 21 performs beamformer processing based on the weighted spatial covariance matrix which is updated, and updates an auxiliary estimation value of the target sound (S21). More specifically, the beamformer unit 21 updates each filter coefficient $w_{n,j}$ by Equation (17). The beamformer unit 21 updates each auxiliary estimation value $y_{j,t}$ of the target sound by Equation (18).

[First Switch Unit 22]

The first switch unit 22 updates the switch weight and the power of the target sound based on the updated auxiliary estimation value, and outputs the estimation value of the target sound (S22). More specifically, the first switch unit 22 updates the first switch weight $\delta_{n,j,t}$ of each output ($1 \leq j \leq J$) of the beamformer by Equation (19).

The first switch unit 22 updates the estimation value $y_{n,t}$ of the target sound by Equation (20).

The first switch unit 22 updates the power $\lambda_{n,t}$ of the target sound by Equation (21). The first switch unit 22 outputs the estimation value $y_{n,t}$ of each target sound.

Example 3

<Replacement of Symbols>

In the following example, $\delta_{t,f}^{(j)}$ is a first switch weight related to output of a j-th separation matrix in (time, frequency)=(t, f). In addition, $\beta_{t,f}^{(i,j)}$ is a linked switch weight satisfying $\beta_{t,f}^{(i,j)}=\gamma_{t,f}^{(i)}\delta_{t,f}^{(j)}$.

<Features of Acoustic Signal Enhancement Device according to Example 3>

The acoustic signal enhancement device according to the present example can perform estimation with high accuracy even in a case where an estimation value of an acoustic transmission characteristic cannot be obtained in advance (=blind processing).

In addition, in order to realize the blind processing, an optimization criterion different from optimization criteria of the above examples is used.

The acoustic signal enhancement device according to the present example simultaneously estimates N target sounds and M-N noise components. That is, the estimation is processed as a problem of reverberation suppression+sound source separation. Accordingly, the beamformer unit has the following configuration.

- A separation matrix including N beamformers for estimating target sounds and M-N beamformers for estimating noise components is set as an estimation target.
- A configuration in which all the beamformers included in the separation matrix are simultaneously switched is used. In Examples 1 and 2, a configuration in which the beamformers are independently switched for each target sound is used.

<Configuration of Filter>

The reverberation suppression processing is performed according to Equation (22).

[Math. 19]

$$z_{t,f} = x_{t,f} - G_{t,f}^H \bar{x}_{t,f} \tag{22}$$

Here, $x_{t,f}$ (x is in bold and t and f are in italics) is a recording sound vector in all microphones at a timing t (t is in italics) and a frequency f (f is in italics). Assuming that a recording sound in an m-th microphone is set as $x_{m,t,f}$, $x_{t,f}=[x_{1,t,f}, \ldots, x_{M,t,f}]^T$ (M is the number of microphones). Similarly, $z_{t,f}=[z_{1,t,f}, \ldots, z_{M,t,f}]^T$ is a reverberation-suppressed sound vector at a timing t (t is in italics) and a frequency f (f is in italics). Here, $\bar{x}_{t,f}=[x_{t-D,f}^T, \ldots, x_{t-L+1,f}^T]^T$ (x is in bold and t and f are in italics) represents a time-series vector of a past recording sound from a timing t−L+1 to a timing t−D (L is an order of the filter, and D is a predicted delay of reverberation suppression processing), $G_{t,f} \in \mathbb{C}^{M(L-D) \times M}$ represents a filter of reverberation suppression processing (G is in bold, t and f are in italics, and $\mathbb{C}^{M(L-D) \times M}$ is a whole set of an M (L-D)×M dimensional complex matrix), and $(\cdot)^T$ and $(\cdot)^H$ represent non-conjugate transposition and conjugate transposition of a matrix.

Equation (22) is substantially the same as Equation (1). On the other hand, in the present embodiment, a frequency f needs to be expressed individually, and thus Equation (22) is expressed as described above. The same applies to the following Equations.

The beamformer processing for sound source separation is performed according to Equation (23).

[Math. 20]

$$y_{t,f} = W_{t,f}^H z_{t,f} \tag{23}$$

Here, $y_{t,f}$ (y is in bold and t and f are in italics) is a vector including all the estimated sounds at a timing t (t is in italics) and a frequency f (f is in italics). Assuming that an n-th estimated sound is set as $y_{n,t,f}$, $y_{t,f}=[t_{1,t,f}, \ldots, y_{N,t,f}]^T$ (N is the number of sound sources). $W_f \in \mathbb{C}^{M \times N}$ represents a separation matrix (W is in bold, t is in italics, and $\mathbb{C}^{M \times N}$ is a whole set of an M×N-dimensional complex matrix) of sound source separation.

The filter coefficients in Equation (22) and Equation (23) are further realized by a weighted sum of a plurality of coefficients as in Equation (24) (Similar to Example 1).

[Math. 21]

$$G_{t,f} = \sum_{i=1}^{I} \gamma_{t,f}^{(i)} G_f^{(i)} \tag{24}$$

and $$W_{t,f} = \sum_{J=1}^{J} \delta_{t,f}^{(j)} W_f^{(j)}$$

$G_f^{(i)}$ in Equation (24) represents a filter coefficient of the i-th reverberation suppression processing at a frequency f. $W_f^{(j)}$ in Equation (24) represents a filter coefficient of the j-th separation matrix (configured by the beamformers of all the sound sources) at a frequency f.

$\beta_{t,f}^{(i,j)}$ ($=\gamma_{t,f}^{(i)}\delta_{t,f}^{(j)}$) in Equation (25) is a switch weight for an i-th reverberation suppression filter and a j-th separation matrix at a timing t and a frequency f. Hereinafter, all of $\beta_{t,f}^{(i,j)}$ may be replaced with $\gamma_{t,f}^{(i)}\delta_{t,f}^{(j)}$ for calculation.

When Equation (24) is used, $y_{t,f}$ obtained by Equation (22) and Equation (23) can be calculated as follows.

[Math. 22]

$$y_{t,f}^{(i,j)} = \left(W_f^{(j)}\right)^H \left(x_{t,f} - \left(G_{t,f}^{(i)}\right)^H \bar{x}_{t,f}\right) \tag{25}$$

$$y_{t,f} = \sum_{i=1}^{I}\sum_{j=1}^{J} \beta_{t,f}^{(i,j)} y_{t,f}^{(i,j)}$$

In the above Equation, $y_{t,f}^{(i,j)}$ is a signal obtained when the filter of the i-th reverberation suppression processing and the j-th separation matrix are applied to the recording sound.

<Criterion of Optimization>

The estimated sound sources are independent from each other as described in Equation (26).

[Math. 23]

$$p(\{y_{n,t,f}\}_{n,t,f}) = \prod_{n=1}^{M}\prod_{t=1}^{T}\prod_{f=1}^{F} p(y_{n,t,f}) \tag{26}$$

It is assumed that the estimated sound source follows a complex Gaussian distribution with an average of 0 and a variance $\lambda_{n,t,f}$ as in Equation (27).

[Math. 24]

$$p(y_{n,t,f};\lambda_{n,t,f}) = (\pi\lambda_{n,t,f})^{-1}\exp\left(-\frac{|y_{n,t,f}|^2}{\lambda_{n,t,f}}\right) \tag{27}$$

The likelihood functions of Equation (28) and Equation (29) serve as criteria for optimization of the acoustic signal enhancement processing under the configuration of the filter and the assumption of Equation (26) and Equation (27).

[Math. 25]

$$\mathcal{L}(\mathcal{G},\mathcal{W},\Lambda,\mathcal{B}) = \sum_{t,f,i,j}\beta_{t,f}^{(i,j)}\mathcal{L}_{t,f}^{(i,j)}\left(G_f^{(i)}, W_f^{(j)}, \Lambda_{t,f}\right) \tag{28}$$

[Math. 26]

$$\mathcal{L}_{t,f}^{(i,j)}\left(G_f^{(i)}, W_f^{(j)}, \Lambda_{t,f}\right) = -\sum_{n=1}^{M}\left(\frac{\left|y_{n,t,f}^{(i,j)}\right|^2}{\lambda_{n,t,f}} + \log\lambda_{n,t,f}\right) + 2\log\det\left|W_f^{(j)}\right| \tag{29}$$

Here, B (script font)=$\{\gamma_{t,f}^{(i)}, \delta_{t,f}^{(j)}\}_{i,j,t,f}$. The parameters (all filter coefficients, switch weights, power of each separated sound (=variance of the complex Gaussian distribution)) that maximize the likelihood function are obtained.

<Optimization Method>

A method of obtaining parameters that maximize Equation (28) in a closed form is not known. Thus, optimization is performed by repeating processing of alternately updating (at that time, other parameters are fixed) individual parameters.

Figure 9:
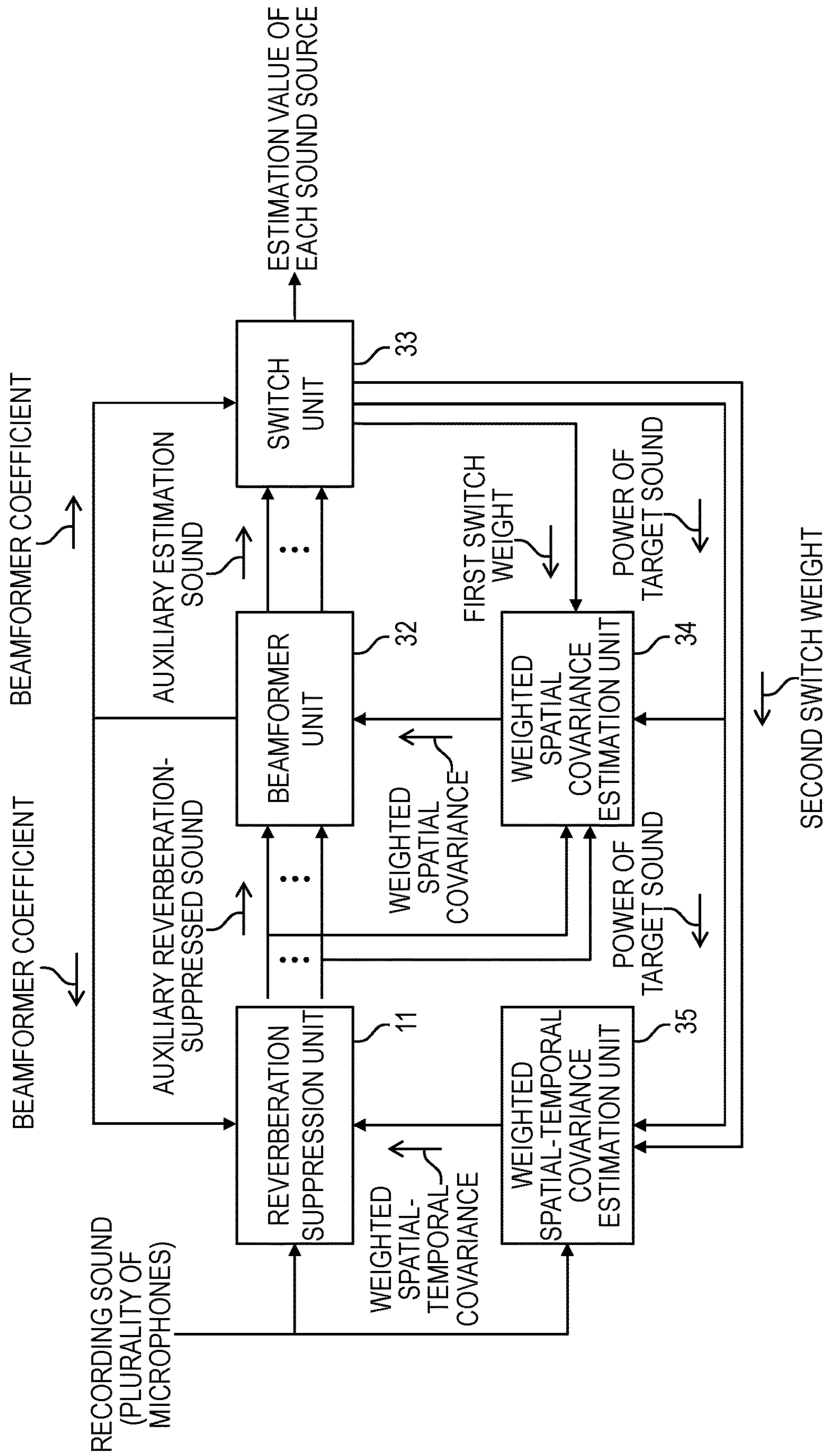
FIG. 9 is a block diagram illustrating a configuration of an acoustic signal enhancement device according to Example 3.
Figure 10:
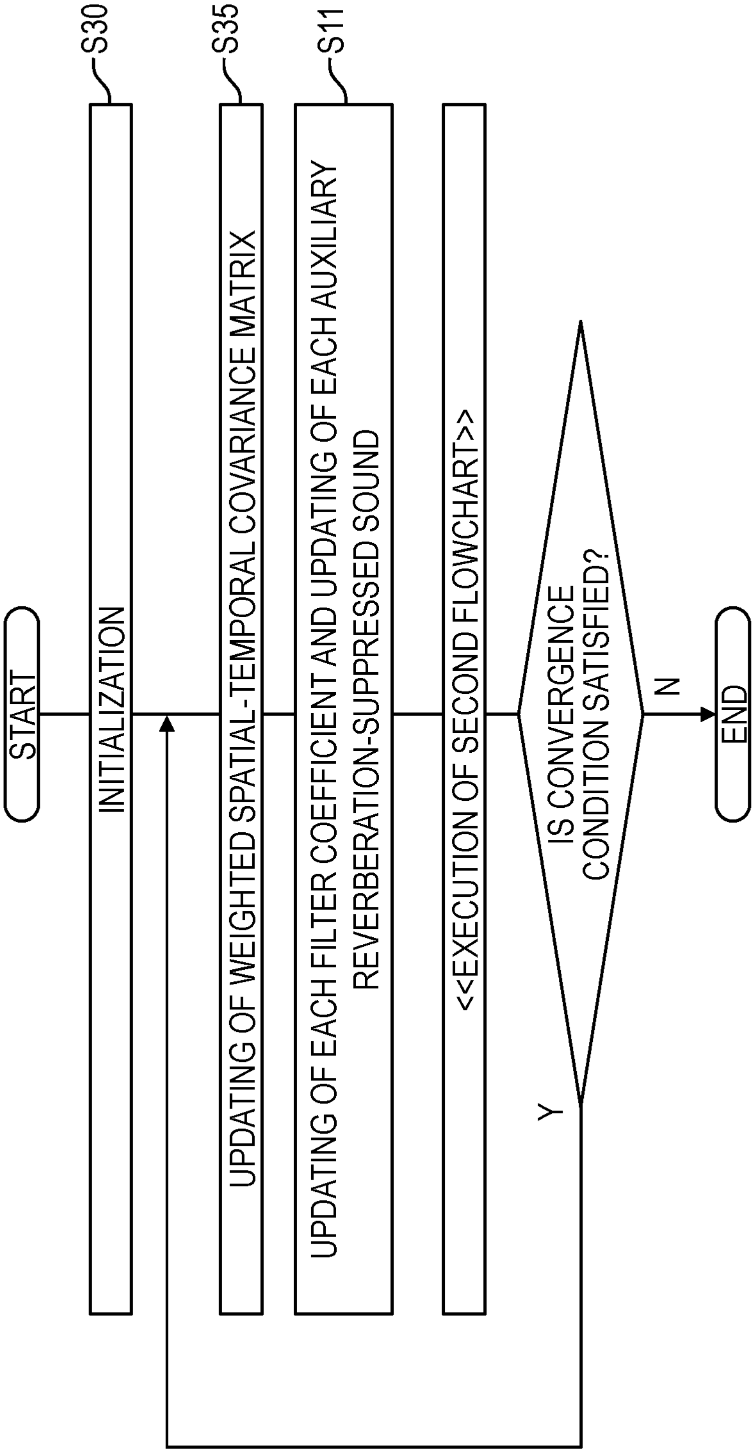
FIG. 10 is a first flowchart illustrating an operation of the acoustic signal enhancement device according to Example 3.

Hereinafter, a functional configuration of a target sound enhancement device 3 according to the present example will be described with reference to FIG. 9. As illustrated in FIG. 9, the target sound enhancement device 3 according to the present example includes a reverberation suppression unit 11, a beamformer unit 32, a switch unit 33, a weighted spatial covariance estimation unit 34, and a weighted spatial-temporal covariance estimation unit 35. Hereinafter, an operation (first flowchart) of the target sound enhancement device 3 will be described with reference to FIG. 10.

<Processing Flow: Initialization>

The target sound enhancement device 3 performs, for the recording sound, initialization on the power $\lambda_{n,t,f}$ of each target sound and the filter coefficients $G_f^{(i)}$ and $W_f^{(j)}$ by using the power of each separated sound and the filter coefficients (common to all switches), which are obtained by a blind convolution beamformer (referenced Non Patent Literature 6) in the related art, and initializes all the switch weights by using a random number (S30).

(Referenced Non Patent Literature 6: Tomohiro Nakatani, Rintaro Ikeshita, Keisuke Kinoshita, Shoko Araki, Hiroshi Sawada, Computationally efficient and versatile framework for blind speech separation and dereverberation, Proc. Interspeech, pp. 91-95, 2020.)

<Processing Flow: Repeat Processing until Convergence Condition is Satisfied>

The target sound enhancement device 3 repeats the following processing (S35, S11, and execution of second flowchart) until a convergence condition is satisfied.

<Processing Flow: Weighted Spatial-Temporal Covariance Estimation>

The weighted spatial-temporal covariance estimation unit 35 updates the weighted spatial-temporal covariance matrices $R_{n,f}^{(i,j)}$ and $P_{n,f}^{(i,j)}$, which are related to each sound source (1≤n≤M) included in the output (1≤j≤J) of each separation matrix and each output (1≤i≤I) of the reverberation suppression processing, by Equation (30) and Equation (31) (S35).

[Math. 27]

$$R_{n,f}^{(i,j)} = \sum_{t=1}^{T}\frac{\beta_{t,f}^{(i,j)}}{\lambda_{n,t,f}}\bar{x}_{t,f}\bar{x}_{t,f}^H \tag{30}$$

$$P_{n,f}^{(i,j)} = \sum_{t=1}^{T}\frac{\beta_{t,f}^{(i,j)}}{\lambda_{n,t,f}}\bar{x}_{t,f}x_{t,f}^H \tag{31}$$

<Processing Flow: Reverberation Suppression Processing>

The reverberation suppression unit 11 updates each filter coefficient $G_f^{(i)}$ (1≤i≤I) by Equation (32), Equation (33), and Equation (34), and updates each auxiliary reverberation-suppressed sound $z_{t,f}^{(i)}$ by Equation (35) (S11).

[Math. 28]

$$g_f^{(i)} \leftarrow \left(\Psi_f^{(i)}\right)^{-1} vec\left(\Phi_f^{(i)}\right) \in \mathbb{C}^{M^2(L-D)} \tag{32}$$

$$\Psi_f^{(i)} = \sum_{j=1}^{J}\sum_{n=1}^{M}\left(w_{n,f}^{(j)}\left(W_{n,f}^{(j)}\right)^H\right)^* \otimes R_{n,f}^{(i,j)} \tag{33}$$

$$\Phi_f^{(i)} = \sum_{j=1}^{J}\sum_{n=1}^{M}P_{n,f}^{(i,j)}\left(w_{n,f}^{(j)}\left(w_{n,f}^{(j)}\right)^H\right) \tag{34}$$

$$z_{t,f}^{(i)} = x_{t,f} - \left(G_f^{(i)}\right)^H\bar{x}_{t,f} \tag{35}$$

<Processing Flow: Execution of Second Flowchart>

Figure 11:
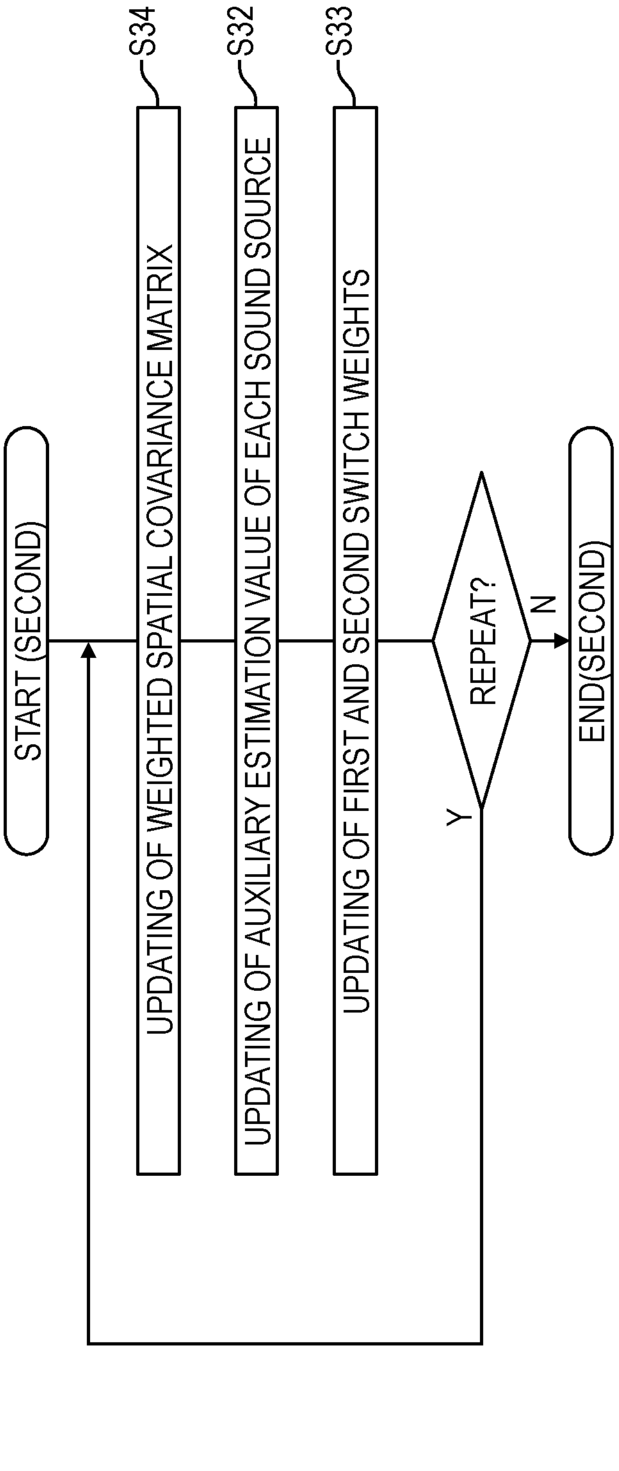
FIG. 11 is a second flowchart illustrating an operation of the acoustic signal enhancement device according to Example 3.

The target sound enhancement device 3 repeats processing of the following steps S34, S32, and S33 a certain number of times (refer to FIG. 11).

<<Processing Flow: Weighted Spatial Covariance Estimation>>

The weighted spatial covariance estimation unit 34 updates the weighted spatial covariance matrix $\Sigma_{n,f}^{(j)}$, which is related to each sound source included in the output (1≤j≤J) of each separation matrix, by Equation (36) (S34).

[Math. 29]

$$\Sigma_{n,f}^{(j)} = \sum_{i=1}^{I}\sum_{t=1}^{T}\frac{\beta_{t,f}^{(i,j)}}{\lambda_{n,t,f}}z_{t,f}^{(i)}\left(z_{t,f}^{(i)}\right)^H \tag{36}$$

<<Processing Flow: Beamformer Processing>>

The beamformer unit 32 updates each filter coefficient $w_{n,f}^{(j)}$ (1≤n≤M, 1≤j≤J) by Equation (37) and Equation (38), and updates the auxiliary estimation value $y_{t,f}^{(i,j)}$ of each sound source by Equation (39) (S32).

[Math. 30]

$$w_{n,f}^{(j)} \leftarrow \left(\left(W_f^{(j)}\right)\sum\nolimits_{n,f}^{(j)}\right)^H e_n \tag{37}$$

$$w_{n,f}^{(j)} \leftarrow w_{n,f}^{(j)} / \left(\left(w_{n,f}^{(j)}\right)^H \sum\nolimits_{n,f}^{(j)} w_{n,f}^{(j)}\right)^{1/2} \tag{38}$$

$$y_{t,f}^{(i,j)} = \left(W_f^{(j)}\right)^H z_{t,f}^{(i)} \tag{39}$$

<<Processing Flow: Switching Processing>>

After the updating of the estimation values $y_{t,f}$ of all the sound sources by Equation (25), the switch unit 33 updates the power $\lambda_{n,t,f}$ (1≤n≤M) of each sound source by Equation (40), and updates the first switch weight and the second switch weight by Equation (41) (alternatively, in a case where the calculation is performed by replacing $\beta_{t,f}^{(i,j)}$ with $\gamma_{t,f}^{(i)}\delta_{t,f}^{(j)}$, Equation (42) is used) (S33).

[Math. 31]

$$\lambda_{n,t,f} \leftarrow |y_{n,t,f}|^2 + \varepsilon \tag{40}$$

$$\beta_{t,f}^{(i',j')} \leftarrow \begin{cases} 1 & \text{if } \{i', j'\} = \underset{(i,j)}{\operatorname{argmax}} \mathcal{L}_{t,f}\left(G_f^{(i)}, W_f^{(j)}, \Lambda_{t,f}\right) \\ 0 & \text{otherwise} \end{cases}. \tag{41}$$

$$\gamma_{t,f}^{(i')} = 1 \text{ and } \delta_{t,f}^{(j')} = 1 \text{ if } (i', j') = \underset{(i,j)}{\operatorname{argmax}} \mathcal{L}_{t,f}^{(i,j)}\left(G_f^{(i)}, W_f^{(j)}, \Lambda_{t,f}\right) \tag{42}$$

$$\gamma_{t,f}^{(i')} = 0 \text{ for other } i', \text{ and } \delta_{t,f}^{(j')} = 0 \text{ for other } j'$$

The target sound enhancement device 3 outputs the estimation values $y_{n,t,f}$ (1≤n≤N) of each target sound.

Example 4

The sound source separation is based on that the order of the sound sources which are separated at different frequencies can be arranged by setting the power $\lambda_{n,t,f}$ of the signal to a common value at all frequencies (referenced Non Patent Literature 7 and the like).

(Referenced Non Patent Literature 7: Nobutaka Ono and Shigeki Miyabe, Auxiliary-function-based independent component analysis for super-Gaussian sources, in LVA/ICA. Springer, pp. 165-172, 2010.)

Also in the present invention, the method can be used in the following procedure.

The weighted spatial covariance estimation unit obtains a frequency average $\lambda_{n,t}$ of the power of each signal by Equation (43).

[Math. 32]

$$\lambda_{n,t} = \frac{1}{F}\sum_{f=1}^{F}\lambda_{n,t,f}. \tag{43}$$

The calculation of the weighted spatial covariance matrix by Equation (36) is performed using $\lambda_{n,t}$ instead of $\lambda_{n,t,f}$.

In Example 3, the first switch weight and the second switch weight are simultaneously updated after updating the filter coefficients for both reverberation suppression and sound source separation. On the other hand, the update of the switch weights does not necessarily have to be performed at the timing, and it is not necessary to simultaneously update the two switch weights. For example, the following configuration can be adopted.

After the filter coefficients for reverberation suppression are updated, the two switch weights are updated or only the second switch weight is updated.

After the filter coefficients for sound source separation are updated, the two switch weights are updated or only the first switch weight is updated.

At any timing, the switch weights may be updated according to the criterion for maximizing the likelihood function under the assumption that other parameters are fixed.

<Functional Configuration of Target Sound Enhancement Device 4 According to Example 4>

Figure 12:
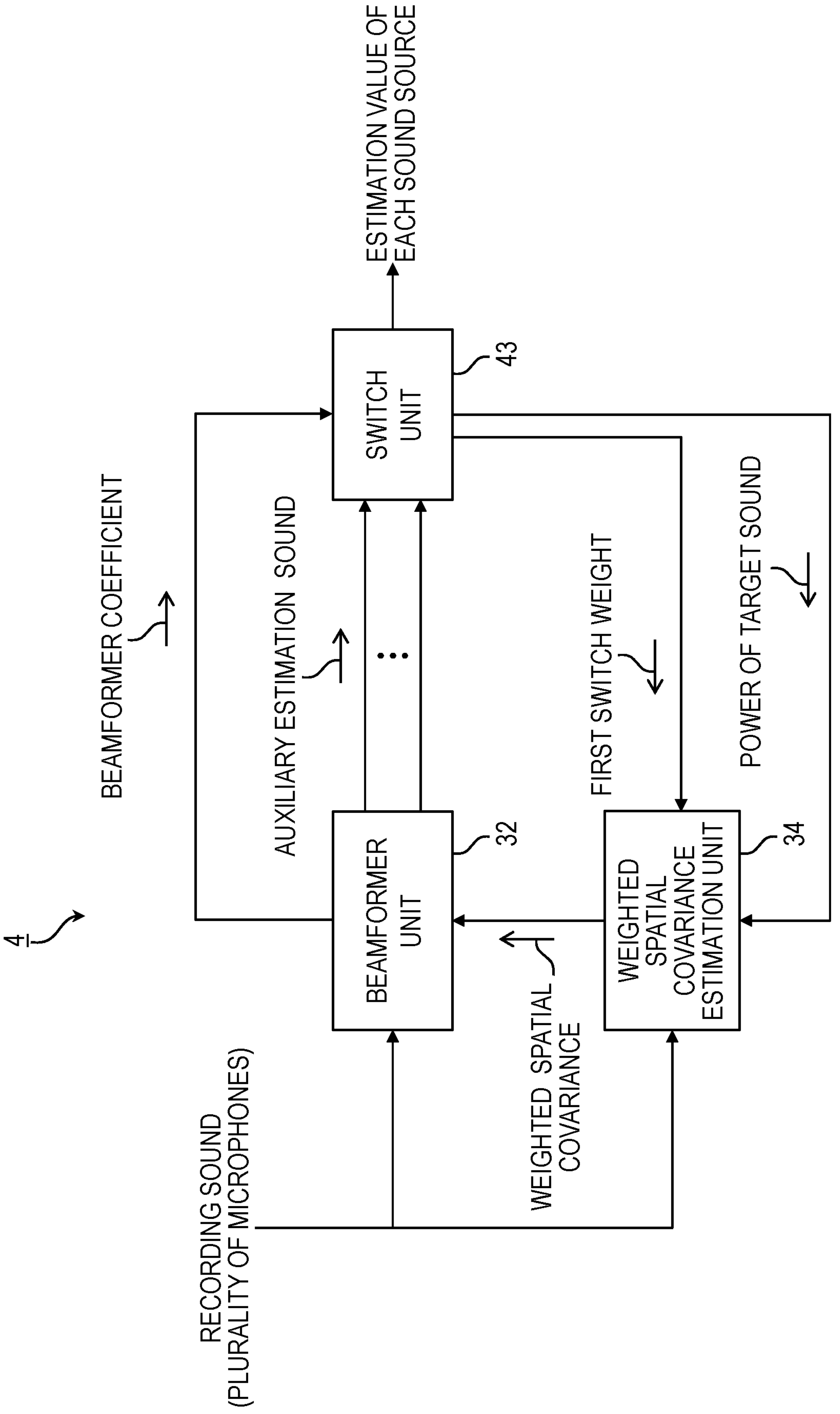
FIG. 12 is a block diagram illustrating a configuration of an acoustic signal enhancement device according to Example 4.

As illustrated in FIG. 12, a target sound enhancement device 4 according to the present example includes a beamformer unit 32, a switch unit 43, and a weighted spatial covariance estimation unit 34.

Modifications from Example 3

The reverberation suppression processing is skipped, and sound source separation is performed by blind processing.

The reverberation suppression filter $G_f^{(i)}$ and the second switch weight $\gamma_{t,f}^{(i)}$ are deleted.

The reverberation suppression unit 11 and the weighted spatial-temporal covariance estimation unit 35 are omitted.

Instead of the auxiliary reverberation-suppressed sound $z_{t,f}^{(i)}$, the recording sound $x_t$ is input to the beamformer unit 32 and the weighted spatial covariance estimation unit 34.

The switch unit 43 skips estimation processing of the second switch weight.

<Criterion of Optimization>

The criterion of optimization is the same as the criterion of optimization in Example 3 except that the above filter configuration is adopted. Here, it is assumed that the likelihood function in Equation (28) and Equation (29) does not include $G_f^{(i)}$ or $\gamma_{t,f}^{(i)}$. For example, the following expression is established.

[Math. 33]

$$\mathcal{L}(\mathcal{W}, \Lambda, \mathcal{B}), \mathcal{L}_{t,f}^{(j)}\left(W_f^{(j)}, \Lambda_{t,f}\right)$$

Further, the following expression is established.

[Math. 34]

$$\mathcal{B} = \left\{\delta_{t,f}^{(j)}\right\}_{j,t,f}$$

<Optimization Method>

The criterion of optimization is the same as the criterion of optimization in Example 3 except that the above filter configuration is adopted.

Figure 13:
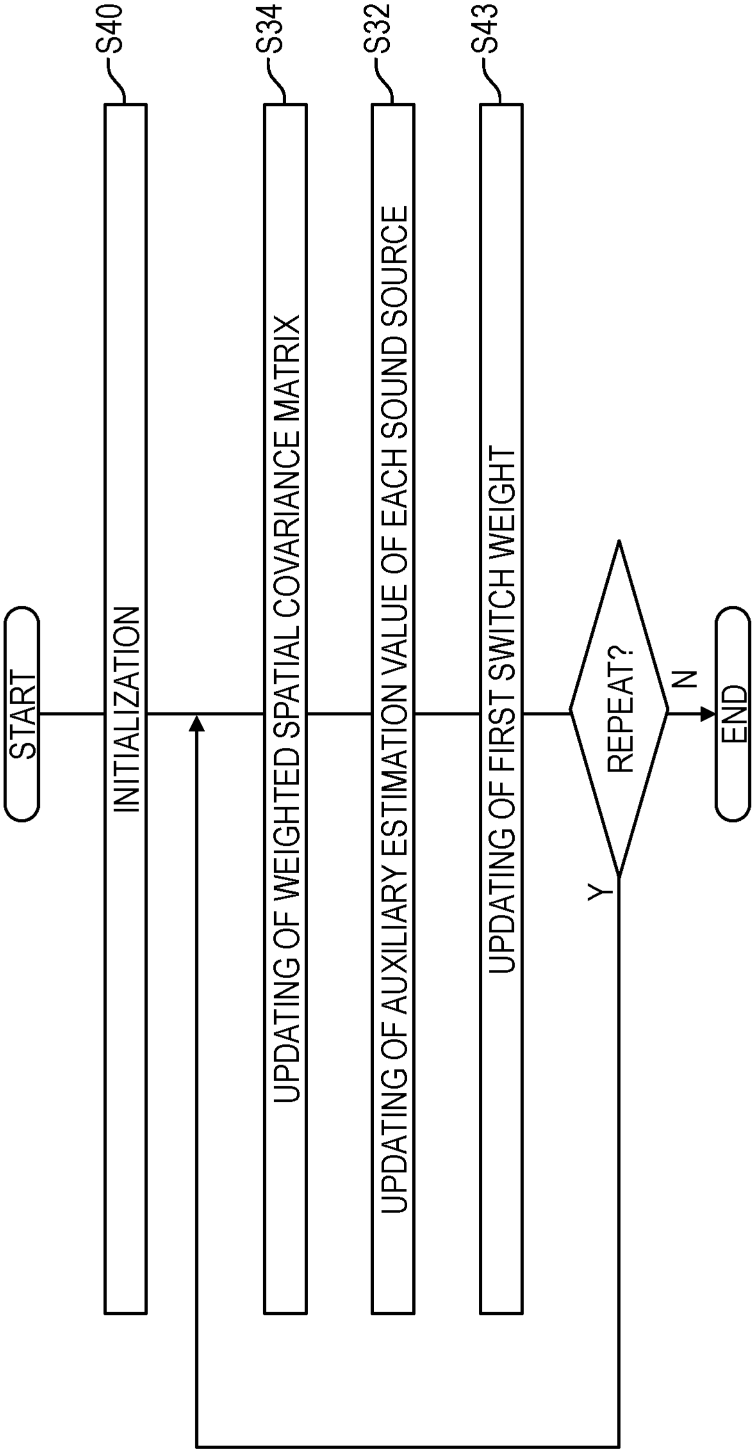
FIG. 13 is a flowchart illustrating an operation of the acoustic signal enhancement device according to Example 4.

Hereinafter, an operation of the target sound enhancement device 4 will be described with reference to FIG. 13.

<Processing Flow: Initialization>

The target sound enhancement device 4 performs, for the recording sound, initialization on the power $\lambda_{n,t,f}$ of each target sound and the filter coefficients $W_f^{(j)}$ by using the power of each separated sound and the filter coefficients (common to all switches), which are obtained by a blind sound source separation method (referenced Non Patent Literature 7) in the related art, and initializes all the switch weights by using a random number (S40).

<Processing Flow: Repeat Processing Until Convergence Condition is Satisfied (or a Certain Number of Times)>

The target sound enhancement device 4 repeats the following processing (S34, S32, and S43) until a convergence condition is satisfied (or a certain number of times).

<Processing Flow: Weighted Spatial Covariance Estimation>

The weighted spatial covariance estimation unit 34 updates the weighted spatial covariance matrix $\Sigma_{n,f}^{(j)}$, which is related to each sound source included in the output ($1\leq j\leq J$) of each separation matrix, by Equation (36) (S34).

<Processing Flow: Beamformer Processing>

The beamformer unit 32 updates each filter coefficient $w_{n,f}^{(j)}$ ($1\leq n\leq M$, $1\leq j\leq J$) by Equation (37) and Equation (38), and updates the auxiliary estimation value $y_{t,f}^{(i,j)}$ of each sound source by Equation (39) (S32).

<Processing Flow: Switching Processing>

In the updating of the estimation values $y_{t,f}$ of all the sound sources by Equation (25), the switch unit 43 updates the power $\lambda_{n,t,f}$ ($1\leq n\leq M$) of each sound source by Equation (40), and updates the first switch weight by Equation (41) (more specifically, the following Equation (44)) (S43).

[Math. 35]

$$\delta_{t,f}^{(j')} = 1 \text{ if } j' = \underset{j}{\operatorname{argmax}}\, \mathcal{L}_{t,f}^{(j)}\left(W_f^{(j)}, \Lambda_{t,f}\right) \quad (44)$$

$$\delta_{t,f}^{(j')} = 0 \text{ for other } j'$$

The target sound enhancement device 4 outputs the estimation values $y_{n,t,f}$ ($1\leq n\leq N$) of each target sound.

<Experiment>

In a case where the acoustic signal enhancement processing is applied to recording sounds obtained by recording audios simultaneously uttered by two persons using three microphones in an environment with noise and reverberation, the following experimental results are obtained. It can be seen that the acoustic signal enhancement devices according to Examples 1 and 3 have higher accuracy than the method (Non Patent Literature 2) in the related art.

TABLE 1

| | Average Word Error Rate in Audio Recognition |
|---|---|
| No Processing | 62.49% |
| Method in related art (Non Patent Literature 2) | 32.5% |
| Acoustic Signal Enhancement Device according to Example 1 | 28.3% |
| Acoustic Signal Enhancement Device according to Example 3 | 23.8% |

Advantageous Effects

According to the acoustic signal enhancement device 1 according to Example 1, based on the criterion that the target sound follows the Gaussian distribution in which the power temporally changes, each switch weight, the power of the target sound, the coefficients of the reverberation suppression processing, and the coefficient of the beamformer are optimized by repetitive processing. Therefore, even in a case where an error is included in the sound transmission characteristic of the target sound or reverberation is included in the recording sound, it is possible to accurately suppress the unnecessary sound that temporally changes.

According to the acoustic signal enhancement device 2 according to Example 2, based on the criterion that the target sound follows the Gaussian distribution in which the power temporally changes, the switch weight, the power of the target sound, and the coefficient of each beamformer are optimized by repetitive processing. Therefore, even in a case where an estimation error is included in the estimation value of the sound transmission characteristic, it is possible to accurately suppress the unnecessary sound that temporally changes.

In addition, it is possible to perform optimization by simultaneously considering a viewpoint of whether the recording sound is the background sound or the target sound (efficiency of an audio model) and a viewpoint of how the background sound is spatially distributed (efficiency of the first switch).

Thereby, it is possible to classify the spatial distribution of the background sound around a background sound section. Therefore, even in a case where an error is included in the acoustic transmission characteristic of the target sound, it is possible to accurately suppress the unnecessary sound that temporally changes without being affected by the error.

APPENDIX

A device according to the present invention includes, for example, an input unit to which a keyboard or the like can be connected as a single hardware entity, an output unit to which a liquid crystal display or the like can be connected, a communication unit to which a communication device (for example, a communication cable) capable of communicating with the outside of the hardware entity can be connected, a central processing unit (CPU in which a cache memory, a register, or the like may be included), a RAM or a ROM as a memory, an external storage device as a hard disk, and a bus that connects the input unit, the output unit, the communication unit, the CPU, the RAM, the ROM, and the external storage device such that data can be exchanged therebetween. Further, a device (drive) or the like that can read and write data from and to a recording medium such as a CD-ROM may be provided in the hardware entity as necessary. Examples of a physical entity including such a hardware resource include a general-purpose computer.

The external storage device of the hardware entity stores a program that is required for implementing the above-described functions, data that is required for processing of the program, and the like (the program may be stored, for example, in a ROM as a read-only storage device instead of the external storage device). Further, data or the like obtained by processing of the program is appropriately stored in a RAM, an external storage device, or the like.

In the hardware entity, each program stored in the external storage device (or ROM or the like) and data required for processing of each program are read into a memory as necessary, and are interpreted and processed by the CPU as appropriate. Thereby, the CPU realizes a predetermined function (each configuration requirement represented as the unit, the means, or the like).

The present invention is not limited to the above-described embodiment and can be appropriately modified without departing from the gist of the present invention. Further, the processing described in the above embodiment may be executed not only in chronological order according to the described order, but also in parallel or individually according to the processing capability of the device that executes the processing or as necessary.

As described above, in a case where the processing function of the hardware entity (the device according to the present invention) described in the above embodiment is implemented by a computer, processing content of the function of the hardware entity is described by a program. In addition, the computer executes the program, and thus, the processing function of the hardware entity is implemented on the computer.

Figure 14:
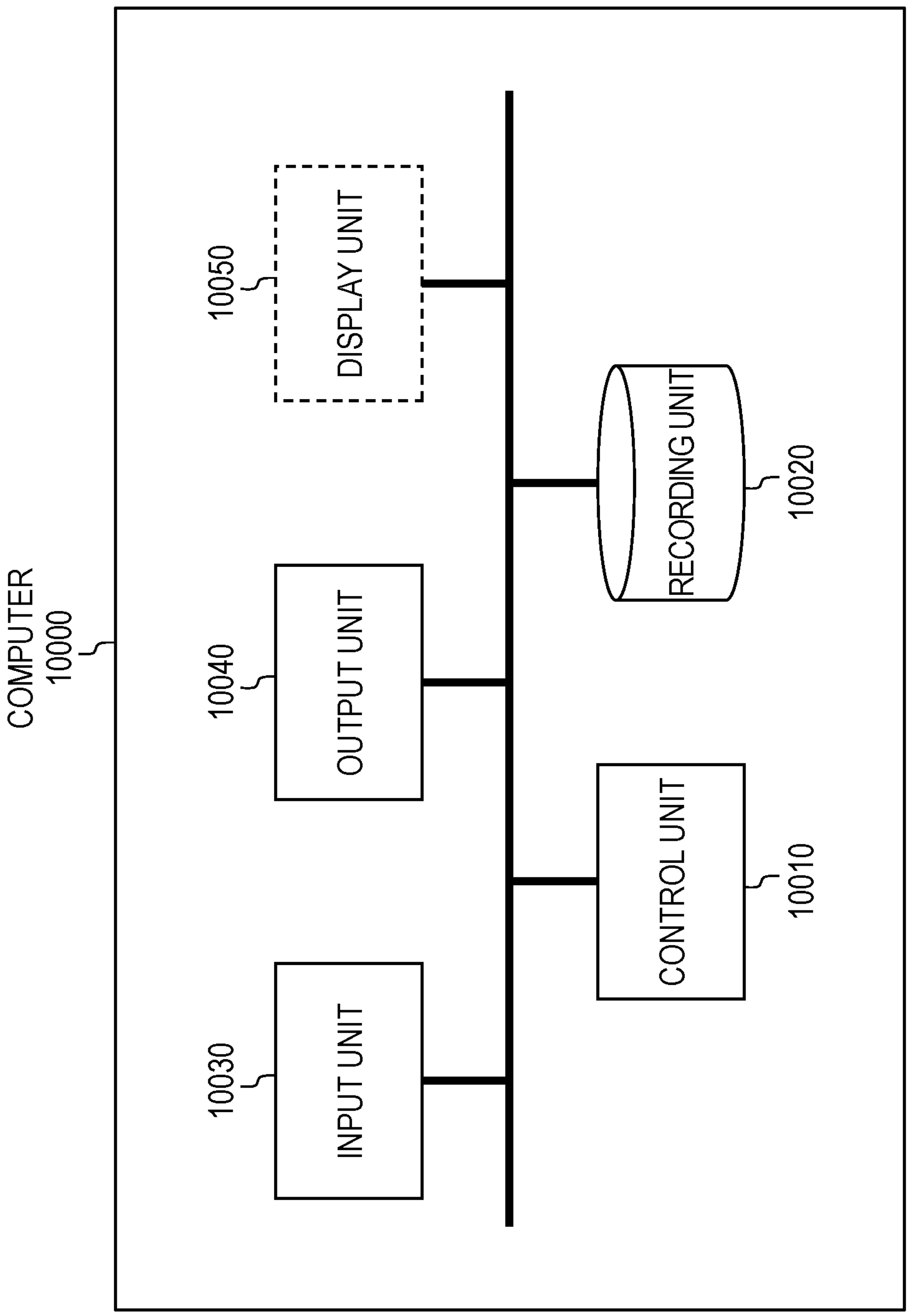
FIG. 14 is a diagram illustrating a functional configuration example of a computer.

The computer illustrated in FIG. 14 is caused to read the program for executing each step of the method described above into a recording unit 10020 and to operate a control unit 10010, an input unit 10030, an output unit 10040, and the like. Thereby, various processing described above can be performed.

The program in which the processing content is written can be recorded in a computer-readable recording medium. The computer-readable recording medium may be, for example, any recording medium such as a magnetic recording device, an optical disk, a magneto-optical recording medium, or a semiconductor memory. Specifically, for example, a hard disk device, a flexible disk, a magnetic tape, or the like can be used as the magnetic recording device, a digital versatile disc (DVD), a DVD random access memory (DVD-RAM), a compact disc read only memory (CD-ROM), a CD recordable/rewritable (CD-R/RW), or the like can be used as the optical disk, a magneto-optical disc (MO) or the like can be used as the magneto-optical recording medium, an electrically erasable and programmable-read only memory (EEP-ROM), or the like can be used as the semiconductor memory.

In addition, distribution of the program is performed by, for example, selling, transferring, or renting a portable recording medium such as a DVD or a CD-ROM on which the program is recorded. Further, a configuration in which the program is stored in a storage device of a server computer and the program is distributed by transferring the program from the server computer to other computers via a network may also be employed.

For example, the computer that executes such a program first temporarily stores the program recorded in the portable recording medium or the program transferred from the server computer in the storage device of the own computer. In addition, when executing processing, the computer reads the program stored in the recording medium of the own computer and executes processing according to the read program. In addition, as another execution form of the program, the computer may directly read the program from the portable recording medium and execute processing according to the program, and the computer may sequentially execute processing according to a received program each time the program is transferred from the server computer to the computer. Alternatively, the above processing may be performed by a so-called application service provider (ASP) service that implements a processing function only by issuing an instruction to perform the program and acquiring the result, without transferring the program from the server computer to the computer. The program in the present embodiment includes information used for a process by an electronic computer and equivalent to the program (data or the like that is not a direct command to the computer but has a property that defines processing by the computer).

Further, in the embodiment, the hardware entity is configured by executing a predetermined program on a computer. On the other hand, at least some of the processing contents may be implemented by hardware.

The invention claimed is:

1. An acoustic signal enhancement device that receives, as an input, a recording sound obtained by frequency division and updates parameters, the acoustic signal enhancement device comprising:

processing circuitry configured to:

assuming that a switch weight is a weight indicating a ratio of a classification to which a recording sound at each timing belongs in classifications of spatial states where a recording sound temporally changes, perform beamformer processing based on a weighted spatial covariance matrix which is updated and update an auxiliary estimation value of a target sound;

update the switch weight and power of a target sound based on the updated auxiliary estimation value and output an estimation value of the target sound; and update the weighted spatial covariance matrix based on the updated switch weight and the power.

2. An acoustic signal enhancement device that receives, as an input, a recording sound obtained by frequency division and updates parameters, the acoustic signal enhancement device comprising:

processing circuitry configured to:

assuming that a first switch weight is a weight indicating a ratio of a classification to which a recording sound at each timing belongs in classifications of spatial states where a recording sound temporally changes, and assuming that a second switch weight is a weight indicating a ratio of a classification to which a recording sound at each timing belongs in classifications of spatial-temporal states where a recording sound temporally changes, perform reverberation suppression processing on the recording sound based on a weighted spatial-temporal covariance matrix which is updated and update an auxiliary reverberation-suppressed sound of a target sound;

update the second switch weight based on the auxiliary reverberation-suppressed sound, updated power of the target sound, and an updated beamformer coefficient;

update an estimation value of the target sound, the beamformer coefficient, the power of the target sound, and the first switch weight of the target sound based on at least one of the auxiliary reverberation-suppressed sounds; and update the weighted spatial-temporal covariance matrix based on the first switch weight, the second switch weight, and the power.

3. The acoustic signal enhancement device according to claim 2, wherein processing circuitry configured to:

perform beamformer processing based on a weighted spatial covariance matrix which is updated and update an auxiliary estimation value of the target sound;

update the first switch weight and power of the target sound based on the updated auxiliary estimation value and output the estimation value of the target sound; and update the weighted spatial covariance matrix based on the updated first switch weight and the power.

4. An acoustic signal enhancement device that receives, as inputs, recording sounds from a plurality of microphones, the acoustic signal enhancement device comprising:

processing circuitry configured to, assuming that a first switch weight is a weight indicating a ratio of a classification to which a recording sound at each timing belongs in classifications of spatial states where a recording sound temporally changes, and assuming that a second switch weight is a weight indicating a ratio of a classification to which a recording sound at each timing belongs in classifications of spatial-temporal states where a recording sound temporally changes, update a weighted spatial covariance matrix for estimating a coefficient for obtaining a target sound of a beamformer based on the first and second switch weights, power of each sound source, and an auxiliary reverberation-suppressed sound of each sound source;

update the coefficient of the beamformer which estimates a separation sound of a separation matrix based on the weighted spatial covariance matrix and update an auxiliary estimation value of each sound source based on the updated coefficient of the beamformer and the auxiliary reverberation-suppressed sound; and update estimation values of all the sound sources based on the first and second switch weights, update power of each sound source based on the estimation values of all the sound sources, and update the first switch weight based on the power of each sound source.

5. The acoustic signal enhancement device according to claim 4, further comprising:

processing circuitry configured to:

update a weighted spatial-temporal covariance matrix for estimating a filter coefficient of reverberation suppression processing based on the first and second switch weights and the power of each sound source; and update the filter coefficient of reverberation suppression processing based on the coefficient of the beamformer and the weighted spatial-temporal covariance matrix and update the auxiliary reverberation-suppressed sound, wherein processing circuitry configured to update the second switch weight in addition to the first switch weight based on the power of each sound source.

6. An acoustic signal enhancement method executed by an acoustic signal enhancement device that receives, as an input, a recording sound obtained by frequency division and updates parameters, the acoustic signal enhancement method comprising:

assuming that a switch weight is a weight indicating a ratio of a classification to which a recording sound at each timing belongs in classifications of spatial states where a recording sound temporally changes, a beamformer step of performing beamformer processing based on a weighted spatial covariance matrix which is updated and updating an auxiliary estimation value of a target sound;

a switch step of updating the switch weight and power of a target sound based on the updated auxiliary estimation value and outputting an estimation value of the target sound; and a weighted spatial covariance estimation step of updating the weighted spatial covariance matrix based on the updated switch weight and the power.

7. An acoustic signal enhancement method executed by an acoustic signal enhancement device that receives, as an input, a recording sound obtained by frequency division and updates parameters, the acoustic signal enhancement method comprising:

assuming that a first switch weight is a weight indicating a ratio of a classification to which a recording sound at each timing belongs in classifications of spatial states where a recording sound temporally changes, and assuming that a second switch weight is a weight indicating a ratio of a classification to which a recording sound at each timing belongs in classifications of spatial-temporal states where a recording sound temporally changes, a reverberation suppression step of performing reverberation suppression processing on the recording sound, performing beamformer processing based on a weighted spatial-temporal covariance matrix which is updated, and updating an auxiliary reverberation-suppressed sound of a target sound;

a switch step of updating the second switch weight based on the auxiliary reverberation-suppressed sound, updated power of the target sound, and an updated beamformer coefficient;

a switching beamformer step of updating an estimation value of the target sound, the beamformer coefficient, the power of the target sound, and the first switch weight of the target sound based on at least one of the auxiliary reverberation-suppressed sounds; and a weighted spatial-temporal covariance estimation step of updating the weighted spatial-temporal covariance matrix based on the first switch weight, the second switch weight, and the power.

8. A program causing a computer to function as the acoustic signal enhancement device according to claim 1.

9. A program causing a computer to function as the acoustic signal enhancement device according to claim 2.

10. A program causing a computer to function as the acoustic signal enhancement device according to claim 3.

11. A program causing a computer to function as the acoustic signal enhancement device according to claim 4.

12. A program causing a computer to function as the acoustic signal enhancement device according to claim 5.

* * * * *